United States Patent
Horn et al.

(10) Patent No.: US 11,363,471 B2
(45) Date of Patent: Jun. 14, 2022

(54) DATA-AIDED BEAM MANAGEMENT

(71) Applicant: QUALCOMM incorporated, San Diego, CA (US)

(72) Inventors: Idan Michael Horn, Hod Hasharon (IL); Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/064,500

(22) Filed: Oct. 6, 2020

(65) Prior Publication Data

US 2022/0110004 A1    Apr. 7, 2022

(51) Int. Cl.
*H04W 4/00* (2018.01)
*H04W 16/28* (2009.01)
*H04W 24/08* (2009.01)
*H04W 24/02* (2009.01)
*H04W 72/04* (2009.01)

(52) U.S. Cl.
CPC .......... *H04W 16/28* (2013.01); *H04W 24/02* (2013.01); *H04W 24/08* (2013.01); *H04W 72/046* (2013.01)

(58) Field of Classification Search
CPC ..... H04W 16/28; H04W 24/02; H04W 24/08; H04W 72/046
USPC .................................. 370/329–330, 335–345
See application file for complete search history.

(56) References Cited

U.S. PATENT DOCUMENTS

| | | | | |
|---|---|---|---|---|
| 2010/0215027 A1* | 8/2010 | Liu | ....................... | H04B 7/0695 370/338 |
| 2010/0265925 A1* | 10/2010 | Liu | ....................... | H04B 7/0617 370/336 |
| 2015/0341095 A1* | 11/2015 | Yu | ....................... | H04W 72/085 370/252 |
| 2016/0065284 A1* | 3/2016 | Yu | .......................... | H04B 7/088 370/329 |
| 2016/0119043 A1* | 4/2016 | Rajagopal | ............ | H04B 7/0695 370/329 |
| 2017/0346535 A1* | 11/2017 | Islam | ................... | H04B 7/0417 |
| 2017/0346545 A1* | 11/2017 | Islam | ................... | H04B 7/0617 |

(Continued)

OTHER PUBLICATIONS

International Search Report and Written Opinion—PCT/US2021/049450—ISA/EPO—dated Dec. 14, 2021.

*Primary Examiner* — Thai D Hoang
(74) *Attorney, Agent, or Firm* — Holland & Hart LLP

(57) ABSTRACT

Methods, systems, and devices for wireless communications are described. Beam management procedures may increase communications quality and reliability in wireless networks that support narrow directional beams and high frequencies. Some such beam management procedures utilize continuous beam measurements and adaptive beam switching to maintain a threshold link level between devices. A user equipment (UE) may transmit an indication of a capability to perform a first beam refinement procedure in response to a data transmission and using multiple receive beams. The UE may select a communication beam using a first instance of a second beam refinement procedure, and may receive a data transmission from a base station using the selected beam. Based on receiving the data transmission, the UE may perform the first beam refinement procedure and may skip a second instance of the second beam refinement procedure.

30 Claims, 17 Drawing Sheets

(56) References Cited

U.S. PATENT DOCUMENTS

| | | | |
|---|---|---|---|
| 2018/0368126 A1* | 12/2018 | Islam | H04L 5/0048 |
| 2019/0068270 A1* | 2/2019 | Schenk | H04B 7/0695 |
| 2019/0268053 A1* | 8/2019 | John Wilson | H04W 72/042 |
| 2019/0357193 A1* | 11/2019 | Bai | H04W 72/10 |
| 2020/0136708 A1 | 4/2020 | Pan et al. | |
| 2020/0186229 A1* | 6/2020 | Raghavan | H04B 7/0695 |
| 2020/0228180 A1 | 7/2020 | Zhang et al. | |
| 2020/0412434 A1* | 12/2020 | Zhu | H04W 56/0015 |
| 2021/0266955 A1* | 8/2021 | Taherzadeh Boroujeni | H04W 72/046 |

* cited by examiner

DATA-AIDED BEAM MANAGEMENT

TECHNICAL FIELD

The following relates to wireless communication, and specifically to data-aided beam management techniques.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may implement various beam selection and beam refinement techniques to establish and maintain communications in a wireless communications network. Performing some beam refinement techniques multiple times, however, may involve relatively long durations for performance, relatively infrequent beam management periodicity compared to beam condition changes, relatively high overhead because some symbols designated for beam refinement may not be able to contain data, or any combination thereof. Enhanced beam management techniques for achieving higher reliability and throughput for such communications are desired.

SUMMARY

The described techniques relate to improved methods, systems, devices, and apparatuses that support data-aided beam management. Generally, the described techniques provide for enhanced beam management procedures to support increased communications quality and reliability in wireless networks that may use, for example, relatively narrow directional beams and relatively high frequencies. Some beam management procedures, in some cases, may utilize beam measurements (for example, reference signal receive power (RSRP) measurements, signal-to-interference-plus-noise ratio (SINR) measurements, channel quality indications (CQI), among other examples) along with adaptive beam switching to maintain a threshold link level between a user equipment (UE) and a base station.

In some cases, devices may implement a multi-step P1-P2-P3 beam management procedure for beam selection and refinement. During the P1 and P2 procedures, the base station may transmit and sweep one or more transmit beams, and may refine the one or more transmit beams (e.g., from relatively wide beams to relatively narrow beams) to select a transmit beam for establishing a connection with the UE. During the P3 procedure, the UE may perform receive beam refinement by receiving transmissions from the selected transmit beam of the base station during consecutive symbols (for example, repeated transmissions by the selected transmit beam) to determine one or more best receive beams to be used by the UE.

In some examples of the present disclosure, the UE may have a capability to concurrently or simultaneously receive a transmission from the base station using multiple receive beams (for example, the UE may receive overlapping transmissions from the base station on multiple receive beams, or may receive multiple transmissions on different receive beams at the same time), which may reduce the time for conducting beam selection and refinement. Based on the capability to conduct beam refinement on multiple receive beams concurrently or simultaneously, the UE may be configured to skip performing one or more later instances of a beam refinement procedure, such as skipping a second instance of the P3 beam refinement procedure, based on one or more conditions. As one example of the one or more conditions, the base station may transmit data to the UE, and the UE may receive the data using one or more receive beams. Based on performing measurements on at least some if not each receive beam in accordance with the UE capability, the UE may skip a later beam refinement procedure, such as the later P3 beam refinement procedure, among other advantages.

One innovative aspect of the subject matter described in this disclosure can be implemented in a method for wireless communication at a UE. The method includes The method may include transmitting, to a base station, an indication of a capability of the UE to perform a first beam refinement procedure in response to a data transmission and using a set of receive beams, selecting a first receive beam from the set of receive beams based on performing a first instance of a second beam refinement procedure using the set of receive beams, receiving the data transmission from the base station using the set of receive beams including the first receive beam before a second instance of the second beam refinement procedure, and performing the first beam refinement procedure based on receiving the data transmission.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to transmit, to a base station, an indication of a capability of the UE to perform a first beam refinement procedure in response to a data transmission and using a set of receive beams, select a first receive beam from the set of receive beams based on performing a first instance of a second beam refinement procedure using the set of receive beams, receive the data transmission from the base station using the set of receive beams including the first receive beam before a second instance of the second beam refinement procedure, and perform the first beam refinement procedure based on receiving the data transmission.

Another innovative aspect of the subject matter described in this disclosure can be implemented in another apparatus for wireless communication at a UE. The apparatus may include means for transmitting, to a base station, an indication of a capability of the UE to perform a first beam refinement procedure in response to a data transmission and using a set of receive beams, selecting a first receive beam from the set of receive beams based on performing a first instance of a second beam refinement procedure using the set of receive beams, receiving the data transmission from the base station using the set of receive beams including the first receive beam before a second instance of the second beam refinement procedure, and performing the first beam refinement procedure based on receiving the data transmission.

Another innovative aspect of the subject matter described in this disclosure can be implemented in an non-transitory computer readable medium for storing code at a UE. The code may include instructions executable by a processor to transmit, to a base station, an indication of a capability of the UE to perform a first beam refinement procedure in response to a data transmission and using a set of receive beams, select a first receive beam from the set of receive beams based on performing a first instance of a second beam refinement procedure using the set of receive beams, receive the data transmission from the base station using the set of receive beams including the first receive beam before a second instance of the second beam refinement procedure, and perform the first beam refinement procedure based on receiving the data transmission.

Another innovative aspect of the subject matter described in this disclosure can be implemented in a method for wireless communication at a base station. The method may include receiving, from a UE, an indication of a capability of the UE to perform a first beam refinement procedure in response to a data transmission and using a set of receive beams, transmitting a same transmit beam over consecutive symbols to the UE as part of a first instance of a second beam refinement procedure, and transmitting the data transmission to the UE before a second instance of the second beam refinement procedure based on receiving the indication of the capability of the UE and transmitting the same transmit beam over consecutive symbols to the UE.

Another innovative aspect of the subject matter described in this disclosure can be implemented in an apparatus at a base station. The apparatus may include a processor, memory coupled with the processor, and instructions stored in the memory. The instructions may be executable by the processor to cause the apparatus to receive, from a UE, an indication of a capability of the UE to perform a first beam refinement procedure in response to a data transmission and using a set of receive beams, transmit a same transmit beam over consecutive symbols to the UE as part of a first instance of a second beam refinement procedure, and transmit the data transmission to the UE before a second instance of the second beam refinement procedure based on receiving the indication of the capability of the UE and transmitting the same transmit beam over consecutive symbols to the UE.

Another innovative aspect of the subject matter described in this disclosure can be implemented in another apparatus at a base station. The apparatus may include means for receiving, from a UE, an indication of a capability of the UE to perform a first beam refinement procedure in response to a data transmission and using a set of receive beams, transmitting a same transmit beam over consecutive symbols to the UE as part of a first instance of a second beam refinement procedure, and transmitting the data transmission to the UE before a second instance of the second beam refinement procedure based on receiving the indication of the capability of the UE and transmitting the same transmit beam over consecutive symbols to the UE.

Another innovative aspect of the subject matter described in this disclosure can be implemented in an non-transitory computer readable medium for storing code at a base station. The code may include instructions executable by a processor to receive, from a UE, an indication of a capability of the UE to perform a first beam refinement procedure in response to a data transmission and using a set of receive beams, transmit a same transmit beam over consecutive symbols to the UE as part of a first instance of a second beam refinement procedure, and transmit the data transmission to the UE before a second instance of the second beam refinement procedure based on receiving the indication of the capability of the UE and transmitting the same transmit beam over consecutive symbols to the UE.

DETAILED DESCRIPTION

Figure 1:
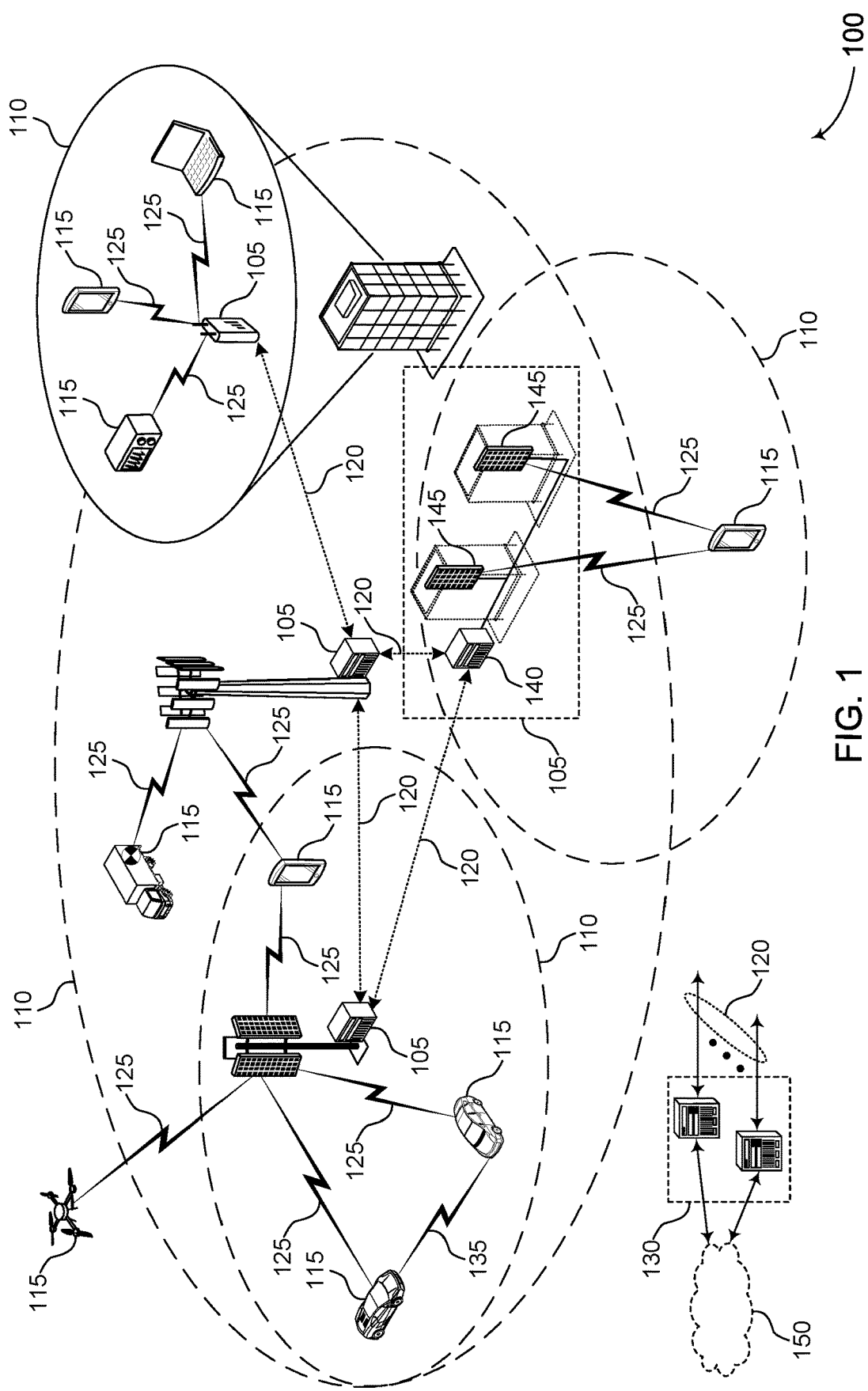
FIG. 1 illustrates an example of a wireless communications system that supports data-aided beam management in accordance with aspects of the present disclosure.

Some beam management procedures may utilize a number of beam measurements (for example, reference signal receive power (RSRP) measurements, signal to interference plus noise ratio (SINR) measurements, or channel quality indications (CQI), among other examples) along with adaptive beam switching to maintain a threshold link level between devices, such as a base station and a user equipment (UE). In some cases, the devices may implement a multi-step P1-P2-P3 beam management procedure for beam selection and refinement. During the P1 and P2 procedures, the base station may transmit and sweep one or more transmit beams, and refine the one or more transmit beams to select one of the one or more transmit beams and for establishing a connection with the UE. During the P3 procedure, the UE may perform receive beam refinement by receiving transmissions from a same transmit beam of the base station during consecutive symbols (for example, repeated transmissions by the selected transmit beam) to determine one or more better or best receive beams to be used by the UE. During the P3 beam refinement procedure, the UE may measure each of the signals received from the selected transmission beam on each of the receive beams, and may determine the one or more better or best receive beams based on the measurements.

Various aspects generally relate to data-aided beam management, and more specifically to conducting beam refinement based on receiving a data transmission and in accordance with a UE capability. In some cases, P3 beam refinement (in which each receive beam is measured separately in a serial manner) may result in relatively large beam-sweeping overhead and signaling latency. In some examples of the present disclosure, however, the UE may have the capability to concurrently or simultaneously receive a transmission from the base station using each receive beam (or a subset of the UE receive beams), which may reduce the time for conducting beam selection and refinement and avoid the disadvantages of the P3 beam refinement.

Based on the capability of the UE to conduct beam refinement on multiple receive beams concurrently or simultaneously, the UE may be further configured to skip (for example, refrain from performing) one or more later instances of another beam refinement procedure (for example, a second instance of the P3 beam refinement procedure) after the initial multi-step P1-P2-P3 procedure may be performed. In some examples, the UE may establish a communication link with the base station (by performing the multi-step P1-P2-P3 procedure) and may transit a capability indication to the base station (for example, an indication of the capability to concurrently or simultaneously receive a data transmission from the base station using multiple receive beams). The base station may transmit data to the UE, for example, after performance of the multi-step P1-P2-P3 procedure, in a physical downlink shared channel (PDSCH) based on receiving the capability indication. Based on receiving the data, the UE may perform beam refinement before a time scheduled for a later instance of the P3 beam refinement procedure and may skip the later instance of the P3 beam refinement procedure. In some other examples, the UE may perform beam refinement based on receiving a demodulation reference signal (DMRS) pilot sequence, a control channel transmission such as a physical downlink control channel (PDCCH) transmission, data, or any combination thereof.

Various procedures for beam selection and beam refinement described herein may increase communications quality and reliability for networks that support relatively large numbers of relatively narrow beams and relatively high frequencies. Particular aspects of the subject matter described in this disclosure may be implemented to realize one or more of the following potential advantages. In some examples, the operations performed by the described communication devices may provide improvements to beam refinement by performing, for example, continuously performing, beam measurements on multiple receive beams of a device (for example, instead of performing beam refinement according to a specified periodicity such as using a P3 procedure). For example, a device may be able to efficiently react to system changes or beam degradation by performing beam refinement earlier based on receiving a data transmission, which may reduce the latency associated with conducting a beam management procedure. In some implementations, the operations performed by the described communication devices may reduce or eliminate later instances of P3 beam refinement, which may also reduce the time used to perform beam management, increase power savings for devices in the network, and allow for alternative use of the time that would otherwise be used for performing one or more later instances of P3 beam refinement. Such alternative use of the time allocated for later P3 beam refinement may additionally save overhead, which may also increase system throughput. In some implementations, operations performed by the described communication devices may also support reduced signaling overhead, improvements to beam management tracking, increased reliability for beamformed communications, higher data rates and throughput and, in some examples, more dynamic beam switching, among other benefits.

Aspects of the disclosure are initially described in the context of wireless communications systems. Aspects of the disclosure are further illustrated by and described with reference to apparatus diagrams, system diagrams, a communications timeline, a process flow, and additional flowcharts that relate to data-aided beam management.

FIG. 1 illustrates an example of a wireless communications system 100 that supports data-aided beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Various procedures for beam selection and beam management may increase communications quality and reliability in wireless networks that support narrow directional beams and high frequencies. Some such beam management procedures utilize continuous beam measurements (for example, RSRP measurements, SINR measurements, CQI, among other examples) along with adaptive beam switching to maintain a threshold link level between devices such as a base station 105 and a UE 115. In some examples, a base station 105 and a UE 115 may implement a multi-step P1-P2-P3 beam management procedure for beam selection and refinement. During the P1 and P2 procedures, the base station 105 may transmit a number of beams (for example, relatively wide beams) for establishing an initial connection with the UE 115, and may refine the transmission beam. During the P3 procedure, the UE 115 may perform receive beam refinement by receiving transmissions of the selected beam from the base station to determine one or more best receive beams to be used to communicate with the base station based on the refinement.

In some examples, however, the UE 115 may have a capability to concurrently or simultaneously receive a transmission from the base station 105 using each receive beam (or a subset of receive beams), which may reduce the time for conducting beam selection and refinement. Based on the capability to conduct beam refinement on multiple receive beams concurrently or simultaneously, the UE 115 may be further configured to skip performing later instances of the P3 beam refinement procedure. The base station 105 may transmit data, for example in a PDSCH, and based on receiving the data before a time to otherwise perform a later instance of the P3 beam refinement procedure, the UE 115 may perform beam refinement and may skip the later instance of the P3 beam refinement procedure.

Figure 2:
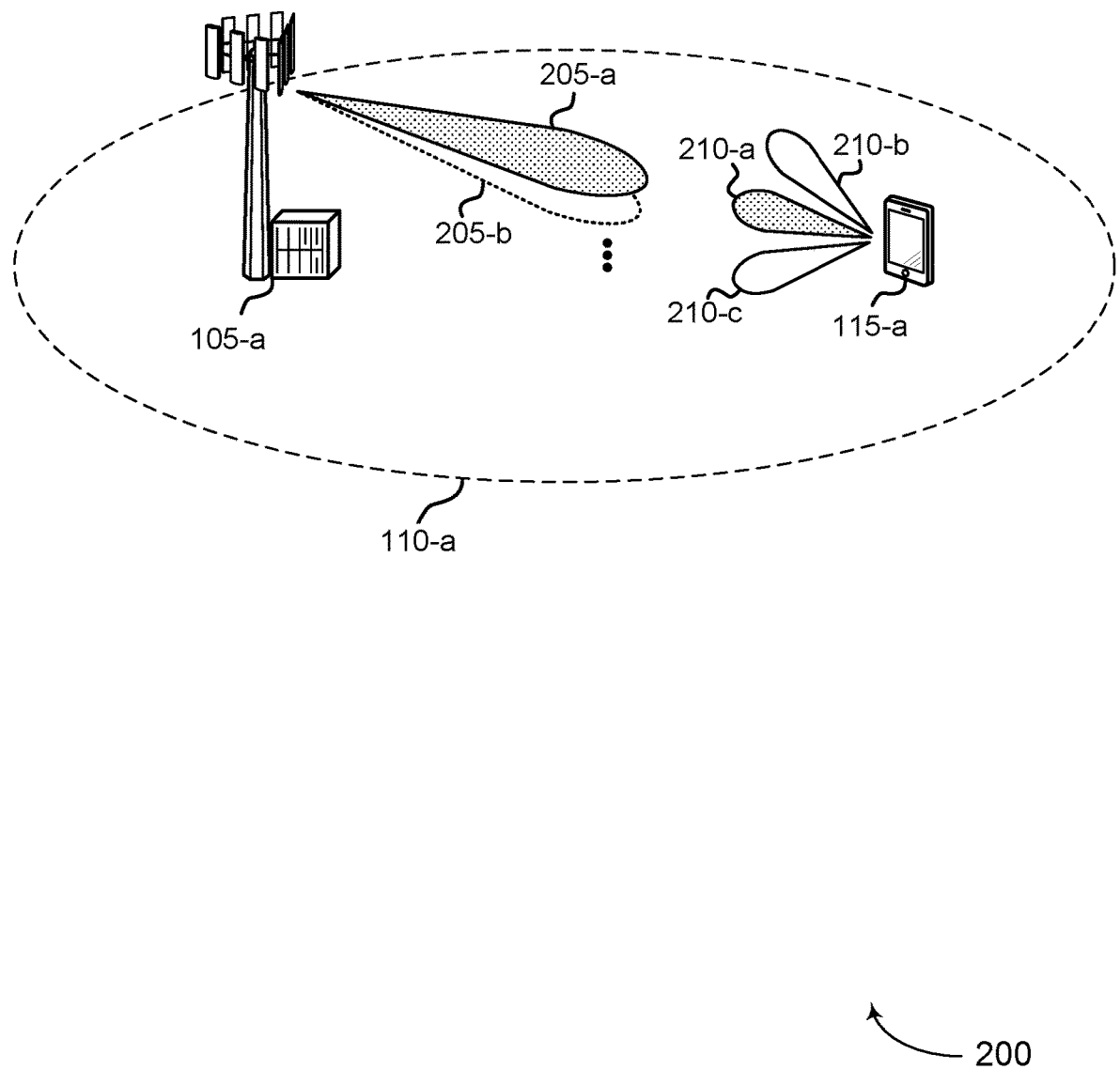
FIG. 2 illustrates an example of a wireless communications system that supports data-aided beam management in accordance with aspects of the present disclosure.

FIG. 2 illustrates an example of a wireless communications system 200 that supports data-aided beam management in accordance with aspects of the present disclosure. In some examples, wireless communications system 200 may implement aspects of wireless communications system 100. For example, the wireless communications system 200 may include a base station 105-a and a UE 115-a, which may be examples of a base station 105 and a UE 115 as described with reference to FIG. 1. The base station 105-a may serve a geographic coverage area 110-a. In some examples, the base station 105-a and the UE 115-a may support various beam management procedures to maintain communications within the wireless communications system 200.

Various procedures for beam forming and beam management may support increased communications quality and reliability in networks in which a large number of narrow beams and high frequencies are used (for example, in mmW/NR wireless networks). Some such beam management procedures utilize a number of beam measurements (for example, RSRP measurements, SINR measurements, among other examples) and beam switching to maintain a threshold link level between a base station and a UE based on beam separation, beam strength, and other beam quality metrics.

The wireless communications system 200 may implement beam training or a number of other beam management procedures to refine transmission and reception beams at the base station 105-a and the UE 115-a. In some examples, the base station 105-a and the UE 115-a may implement a multi-step P1-P2-P3 beam management procedure for beam selection and refinement. During the P1 procedure, the base station 105-a may transmit a number of relatively wide beams (for example, beams 205-a, 205-b) for establishing an initial connection with the UE 115-a. Such wide beam coverage from the base station 105-a may support synchronization and increased mobility of the UE 115-a (for example, the base station 105-a may transmit a number of synchronization signals or synchronization signal blocks (SSBs) during the P1 procedure). During the P1 procedure, the UE 115-a may determine the "best" beam (for example, the beam associated with the highest RSRP, SINR, overall beam quality) of the transmitted wide beams 205, and may report the beam to the base station 105-a. For example, the UE 115-a may determine that the beam 205-a is the best beam for initial communications establishment with the base station 105-a.

During the P2 procedure, the base station 105-a may perform transmission beam refinement by transmitting concurrent or sequential sweeps of the selected beam (beam 205-a) over a relatively narrow range and using relatively narrow beams to refine the selected transmission beam 205-a. The UE 115-a may measure the quality of each beam based on RSRP, or SINR, among other examples, and may report the measurements to the base station 105-a using a feedback message (for example, in a cri-L1-RSRP message, which may include a ranking of one or more beam qualities measured by the UE 115-a). In some examples, the receiving the UE 115-a may transmit an indication of one or more best refined transmission beams to the base station 105-a to identify a selected beam, and in some examples the base station 105-a may determine one or more best transmission beams based on the measurements. In some examples, the base station 105-a may maintain high RSRP for the communications link by switching active beams to the highest quality beam or the beam with the highest signal strength.

During the P3 procedure, the UE 115-a may perform receive beam refinement by receiving transmissions, such as repeated or concurrent transmissions, of the selected beam 205-a from the base station 105-a. The base station 105-a may transmit the selected beam to the UE 115-a (for example, over a consecutive sequence of symbols), and the UE 115-a may receive the transmission using one or more receive beams 210-a, 210-b, or 210-c, or using different panel and beam configurations. For example, the UE 115-a may receive signals on a pair of receive beams 210, on one receive beam 210, on more than two receive beams, on multiple beams from different antenna panels, or on multiple receive beams from the same panels, among other examples. The UE 115-a may measure each of the signals received from the selected transmission beam 205-a on each of the receive beams 210 and may determine one or more best receive beams based on the measurements. For example, the UE 115-a may select receive beam 210-a as the best receive beam. The UE 115-a may use receive beam 210-a to receive transmissions from the base station 105-a. At the completion of the P3 procedure, the transmission and reception beam pairing (between transmission beam 205-a and receive beam 210-b) between the UE 115-a and the base station 105-a may provide high RSRP and reliability for communications.

In some examples, however, the UE 115-a may conduct measurements on transmission or receive beams such that each panel and beam is individually trained or measured at separate times, which may result in large beam-sweeping overhead and signaling latency. For example, UE 115-a may conduct measurements on one or more receive beams individually over (for example, during) different times, which may increase latency due to time used for beam refinement.

In some examples of the present disclosure, the UE 115-a may have the capability to concurrently or simultaneously receive a transmission from the base station using each receive beam (or a subset of receive beams) simultaneously, which may reduce the time for conducting beam selection and refinement. For example, the UE 115-a may receive beam 205-a using each of receive beams 210-a, 210-b, and 210-c over (for example, during) a same time duration. In some examples, the UE 115-a may be further configured with a UE capability that enables the UE 115-a to skip (for example refrain from performing) later instances of the P3 beam refinement procedure after an initial multi-step P1-P2-P3 procedure performed at connection. For example, in cases in which the UE 115-a is configured with the UE capability, and in which the UE receives a data transmission after an initial P3 procedure is performed (for example, as part of the multi-step P1-P2-P3 procedure) the base station 105-a may transmit data instead of repeated beams during what would have been a P3 procedure, and the UE 115-a may decode the data instead of performing the P3 beam refinement procedure. The UE 115-a may establish communications with a base station 105-a (by performing the P1-P2-P3 procedure upon initial connection with the base station 105-a) and the UE 115-a may receive data, for example, in a PDSCH from the base station 105-a. Based on receiving the data, and because the UE 115-a may concurrently or simultaneously receive the data transmission on multiple receive beams 210, the UE 115-a may skip a later P3 beam refinement procedure based on leveraging the operations performed in response to receiving the data. The UE 115-a may conduct measurements (for example, RSRP, SINR, or CQI) on each of the receive beams 210 concurrently or simultaneously and may determine the best beam to use for communicating with the base station 105-a based on the measurements.

The UE 115-a may transmit an indication of this capability to conduct measurements on each of the receive beams 210 concurrently or simultaneously to the base station 105-a (for example, via control signaling such as an RRC or a MAC-CE), and the base station 105-a may skip the later instance of the P3 procedure after transmitting data to the UE 115-a. In addition, the UE 115-a and base station 105-a may maintain flexibility to reinstate the later instance of the P3 procedure, for example, in cases in which the UE 115-a receives a non-data transmission (for example, no data is transmitted between a first instance of the P3 procedure and a scheduled time for a second instance of the P3 procedure), or in examples in which a duration between the data transmission received by the UE 115-a and the later scheduled P3 procedure is greater than a threshold, or in cases in which handover or initial connection establishment again occurs. By performing measurements concurrently or simultaneously on multiple receive beams 210, the UE 115-a may reduce latency for beam refinement and selection, and may efficiently switch beams more often (as opposed to switching over instances allocated for the P3 procedure), which may increase communications quality and reliability, and may reduce latency associated with performing a full beam management procedure.

Figure 3:
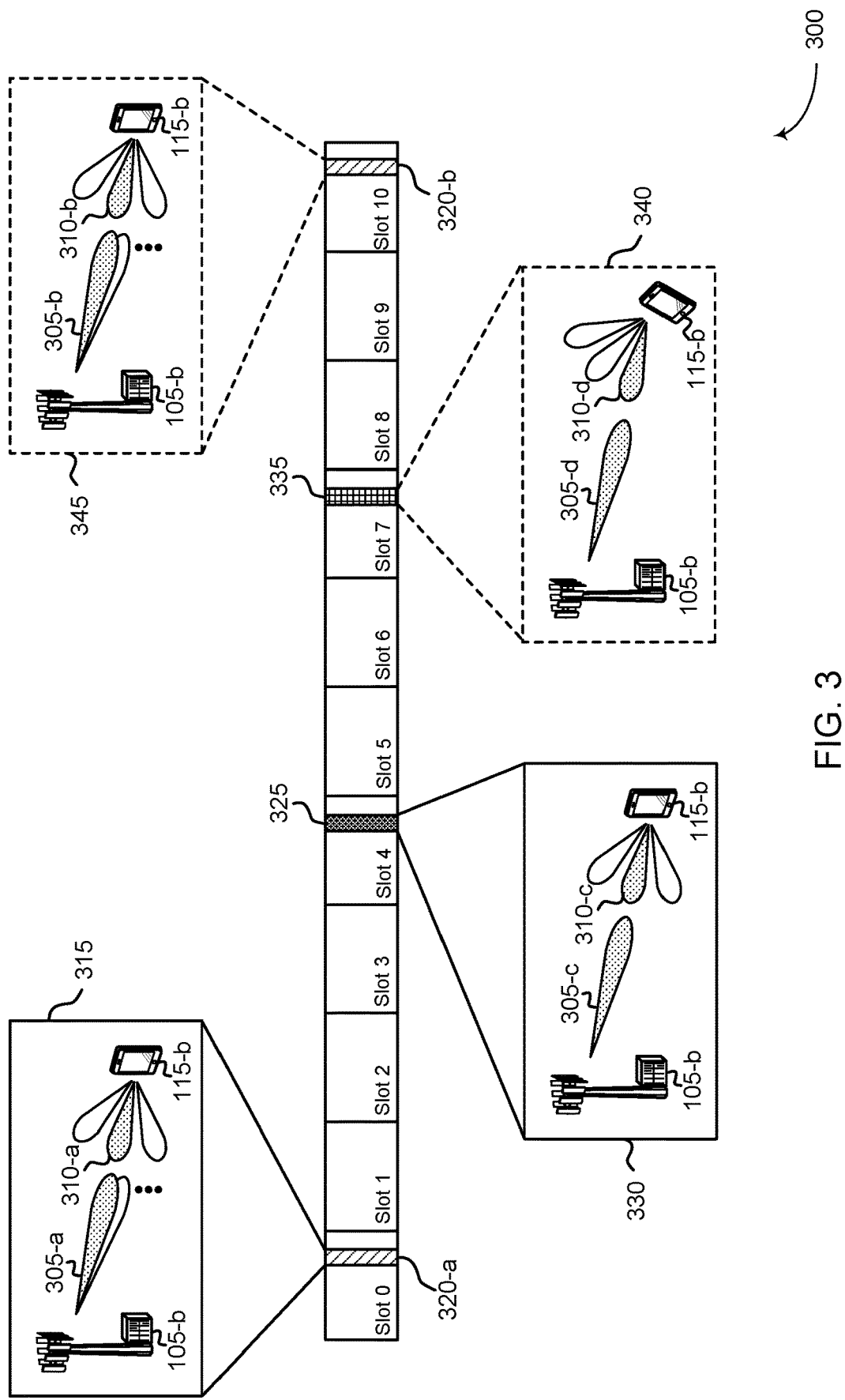
FIG. 3 illustrates an example of a communications timeline that supports data-aided beam management in accordance with aspects of the present disclosure.

FIG. 3 illustrates an example of a communications timeline 300 that supports data-aided beam management in accordance with aspects of the present disclosure. In some examples, communications timeline 300 may be implemented by or may implement aspects of wireless communications system 100. For example, the communications timeline 300 may be related to actions performed by a base station 105-b and a UE 115-b, which may be examples of a base station 105 and a UE 115 as described with reference to FIGS. 1-2.

In some wireless systems, devices such as a UE 115-a and a base station 105-b may conduct beam management processes in accordance with a periodicity to maintain link quality and reliability during ongoing communications. In some examples of the present disclosure, the beam management may be relatively continuous (for example, the UE 115-*b* may perform beam refinement whenever receiving data from the base station such as between a periodicity for performing instances of a beam refinement procedure like the P3 procedure).

At slot 0, the UE 115-*b* and base station may identify a first event 320-*a* that may prompt the UE 115-*b* and base station 105-*b* to perform an initial connection establishment procedure which may include a multi-step P1-P2-P3 beam management procedure 315 for establishing a communication beam pair. For example, the base station may select a number of beams over concurrent symbols including transmit beam 305-*a* during a P1-P2 procedure and the UE 115-*b* may select the receive beam 310-*a*, for example, based on measurements conducted during a P3 procedure.

The UE 115-*b* may transmit a capability indication relatively early on (for example, using RRC signaling) to the base station 105-*b* after initial connection. In some examples, the capability indication may notify the base station that the UE 115-*b* is capable of receiving transmissions concurrently or simultaneously using multiple receive beams (and performing measurements concurrently or simultaneously on the receive beams). Such a UE capability may be employed in wireless networks supporting sub-THz frequency ranges (for example, 140 GHz), which may provide for concurrent or simultaneous beam operation and short wavelength may support a large number of devices in a small area. In some examples, the UE capability may (implicitly or explicitly) notify the base station 105-*b* of a capability of the UE 115-*b* to refrain from performing a second instance of the P3 procedure (for example, a next instance of the P3 procedure) in a subsequent slot (for example, the UE 115-*b* may refrain from performing the P3 procedure 345 in slot 10) in cases in which the UE 115-*b* receives one or more data transmissions after the first P3 procedure (for example, in slot 0) and before the scheduled next P3 procedure (for example, in slot 10).

In some examples, after initial connection with the base station at 320-*a*, the UE 115-*b* may receive a data transmission from the base station 105-*b* at 325 in a downlink transmission. The UE 115-*b* may continuously conduct beam refinement of beams 310 for the transmission (for example, on the PDSCH or a demodulation reference signal (DMRS) of the downlink transmission). The UE 115-*b* may receive the PDSCH or the DMRS using multiple UE receive beams 310, and may measure one or more beam quality metrics such as RSRP, SINR, capacity, CQI, among other examples for at least some if not each received beam, and may determine the best receive beam for the UE 115-*b* to use based on the measurements. For example, the base station 105-*b* may transmit a data transmission 305-*c* during slot 4, and the UE may determine receive beam 310-*c* as the best receive beam to be used based on the measurements made at each receive beam. In such an example, this reflects a change in receive beam from receive beam 310-*a* determined by the initial P3 procedure in slot 0 compared to receive beam 310-*c* determined based on the data transmission 305-*c* in slot 4.

In some examples, the UE 115-*b* may support receive beam measurements for multiple beams transmitted from the base station 105-*b* or from other base stations in the network. For example, the UE 115-*b* may receive multiple beams from multiple directions, and the UE 115-*b* may use multiple receive beams to determine a best quality receive beam for at least some if not each beam (for example, multiple transmission beams from multiple base stations may be measured concurrently or simultaneously).

Based on receiving the transmission of data from the base station 105-*b*, the UE 115-*a* may determine a capability to skip a next P3 procedure (for example, the P3 procedure 345 in slot 10). For example, the UE 115-*a* may determine skip the next P3 procedure based on the capability of the UE 115-*a* to concurrently or simultaneously perform measurements on multiple receive beams, or additionally or alternatively based on a capability of the UE 115-*a* to perform beam mitigation and measurements at different slots. For example, if the UE 115-*a* receives a data transmission from the base station 105-*b*, the P3 procedure in slot 10 may be redundant to any potential determination or adjustment made between slot 0 and slot 10 because of the UE capability and receiving the data from the base station 105-*b*.

In some examples, the base station 105-*b* may transmit a message (for example, via RRC signaling) that notifies the UE 115-*b* that if the UE receives data, the UE 115-*b* may not perform an instance of a subsequent P3 procedure (for example, in slot 10). The base station 105-*b* may determine a UE capability for the UE 115-*b* to do so (for example, via RRC signaling), and based on the UE capability, the base station 105-*b* may suspend a later instance of the P3 procedure if data is transmitted. The base station 105-*b* or the UE 115-*b* or both may instead rely on the UE capability (for example, for continuous beam measurements including DMRS-based beam refinement procedures). The UE 115-*b* may transmit an indication of this capability to the base station 105-*b* so that the base station 105-*b* may determine to refrain from conducting the instance of the subsequent P3 procedure.

Because the UE 115-*b* may measure receive beams concurrently or simultaneously (for example, by conducting measurements of each DMRS of a PDSCH rather than according to a periodicity), the UE 115-*b* may determine system changes or beam quality deterioration due to, for example, UE movement (for example, at 335, a rotation of the UE 115-*b* or a change in location of the UE 115-*b* may cause reduced signal strength for a previously selected best beam such as beam 310-*c*). At 340, the UE 115-*b* may switch receive beams to beam 310-*d* according to the concurrent or simultaneous beam measurement. In such examples, communication beams may be switched based on the duration of an OFDM symbol. For example, upon conducting beam measurements at slot 7, the UE 115-*b* may determine that beam 310-*c* is no longer the best receive beam based on one or more beam measurements, and may determine a different higher quality beam (for example, beam 310-*d*) to switch to for communicating with the base station 105-*b*. In some examples, the UE 115-*b* may change beams during the start of the next slot (slot 8), during the end of the current slot (slot 7), or otherwise upon determining that the beam quality for selected beam 310-*c* has degraded or that beam 310-*d* has relatively better characteristics. In some examples, the beam switching may occur during a duration associated with a cyclic prefix of an OFDM symbol.

In some examples, the UE 115-*b* and base station 105-*b* may determine to reinstate the second instance of the P3 procedure, for example, in cases in which the UE 115-*a* receives a non-data transmission, or in cases in which a duration between the data transmission (for example, at slot 4) and the later-scheduled second instance of the P3 procedure is greater than a threshold, or in cases in which handover or a further initial connection establishment occurs. At slot 9 or at slot 10, for example, the UE 115-*b* and base station may identify a second event 320-*b* that may prompt the UE 115-*b* and base station 105-*b* to perform the second instance of the P3 beam refinement procedure 345.

The base station 105-*b* may transmit a number of beams over concurrent symbols including transmit beam 305-*b* and the UE 115-*b* may select the receive beam 310-*b*, for example, based on measurements conducted during a P3 procedure. In some examples, the P3 procedure 345 may be a second instance of the P3 procedure performed at 315. The P3 procedure 345 may be skipped in cases in which the UE 115-*a* receives data from the base station 105-*b* in between the first P3 procedure (for example, at slot 0) and the second indicated P3 procedure (for example, at slot 10).

Figure 4:
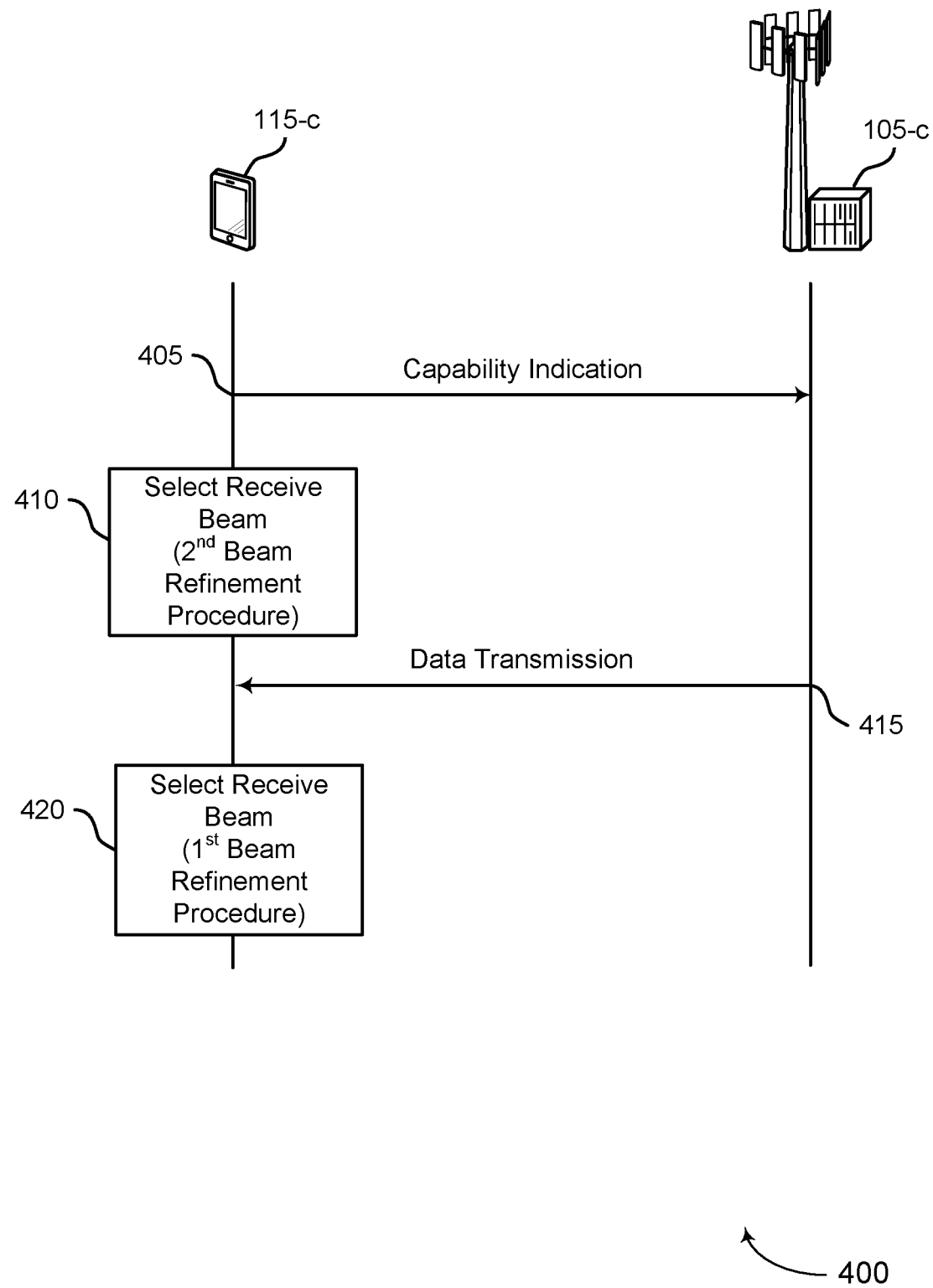
FIG. 4 illustrates an example of a process flow that supports data-aided beam management in accordance with aspects of the present disclosure.

FIG. 4 illustrates an example of a process flow 400 that supports data-aided beam management in accordance with aspects of the present disclosure. In some examples, process flow 400 may be implemented by or may implement aspects of wireless communications system 100 or 200. The process flow 400 includes UE 115-*c* and base station 105-*c* (each of which may be examples of the corresponding devices described with reference to FIGS. 1-3). Alternative examples of the following may be implemented, in which some steps are performed in a different order than described or are not performed at all. In some examples, steps may include additional features not mentioned below, or further steps may be added. In addition, while process flow 400 shows processes between base station 105-*c* and a single UE 115-*c*, it should be understood that these processes may occur between any number of network devices.

At 405, the UE 115-*c* may transmit, to the base station 105-*c* after establishing a communications link, an indication of a capability of the UE 115-*c* to perform a first beam refinement procedure in response to a data transmission. In some examples, the first beam refinement procedure may employ measurements of one or more receive beams at the UE 115-*c*. The UE 115-*c* may transmit the capability indication to the base station 105-*c* using control signaling such as an RRC message, a MAC-CE, or both. In some examples, the capability indication may indicate a capability of the UE 115-*c* to receive the data transmission concurrently or simultaneously using the one or more receive beams. Additionally or alternatively, the capability indication may indicate a capability of the UE 115-*c* to skip or refrain from performing one or more instances of a second beam refinement procedure.

At 410, the UE 115-*c* may perform a connection procedure with the base station 105-*c* to select a receive beam. For example, the UE 115-*c* may perform a first instance of a second beam refinement procedure (for example, a P3 procedure) to select a first receive beam from one or more receive beams. The base station 105-*c* may transmit a same transmit beam over consecutive symbols to the UE 115-*c* as part of the first instance of the second beam refinement procedure and the UE 115-*c* may select a receive beam from a plurality of receive beams to use in receiving from the base station 105-*c*. Alternatively to 405, the UE 115-*c* may transmit, to the base station 105-*c* after performing the connection procedure with the base station 105-*c* to select a receive beam at 410, an indication of a capability of the UE 115-*c* to perform a first beam refinement procedure in response to a data transmission At 415, the UE 115-*c* may receive a data transmission from the base station 105-*c* using the first receive beam after selecting the first receive beam at 410 and before a second instance of the second beam refinement procedure. In some examples, the UE 115-*c* may determine to suspend the second instance of the second beam refinement procedure based on receiving the data transmission. The UE 115-*c* may receive the data transmission on a PDCCH and may measure one or more beam refinement parameters on a DMRS of the PDCCH. In some examples, the UE 115-*c* may be capable of transmitting one or more data transmissions during a duration otherwise associated with the second instance of the second beam refinement procedure based on the UE capability (for example, instead of performing the second instance of the second beam refinement procedure, which may be a P3 procedure, the UE 115-*c* may transmit data to the base station 105-*c*). Such additional data transmission may increase throughput and communications efficiency in the wireless system. Additionally or alternatively, in some examples, the base station 105-*c* may be capable of transmitting or receiving one or more data transmissions during a duration otherwise associated with the second instance of the second beam refinement procedure based on the UE capability (for example, instead of performing the second instance of the second beam refinement procedure, which may be a P3 procedure, the base station 105-*c* may transmit data to the UE 115-*c* or may communicate in some way with one or more other devices such as one or more other UEs 115 or base stations 105 or both).

In some examples, the UE 115-*c* may determine a duration for which to suspend the second beam refinement procedure based at least in part on a doppler spread measurement, a RRC message, or both. The UE 115-*c* may transmit, to the base station, an indication of the duration for which to suspend the second beam refinement procedure via control signaling such as RRC signaling.

In some examples, the UE 115-*c* may receive one or more non-data transmissions from the base station 105-*a* after receiving the data transmission. The UE 115-*c* may determine to perform the second beam refinement procedure based on receiving the one or more non-data transmissions (for example, at the second instance of the second beam refinement procedure).

At 420, the UE 115-*c* may perform the first beam refinement procedure in response to the data transmission and based on receiving the data transmission from the base station 105-*c*. In some examples, the first beam refinement procedure may include measuring one or more beam refinement parameters for each beam of a number of receive beams at the UE 115-*c*, and selecting a second receive beam of the number of receive beams based on performing the beam refinement parameter measurements. Such beam refinement parameters may include RSRP measurements, SINR measurements, CQI, a system capacity, or any combination thereof.

In some examples, the UE 115-*c* may measure the one or more beam refinement parameters for each receive beam during an OFDM symbol period. The UE 115-*c* may compare a first value of the one or more beam refinement parameters associated with the first receive beam to a second value of the one or more beam refinement parameters associated with a second receive beam. Based on comparing the first and second receive beams, the UE 115-*c* may select the second receive beam or the first receive beam. In some examples, the UE 115-*c* may switch from the first receive beam to the second receive beam during the OFDM symbol period or during an adjacent OFDM symbol period.

In some examples, the UE 115-*c* may receive a second data transmission using a third receive beam and may perform the first beam refinement procedure for the first and the third receive beams concurrently. The second data transmission may be transmitted from the base station 105-*c*, or from a different base station or UE present in the wireless system.

Figure 5:
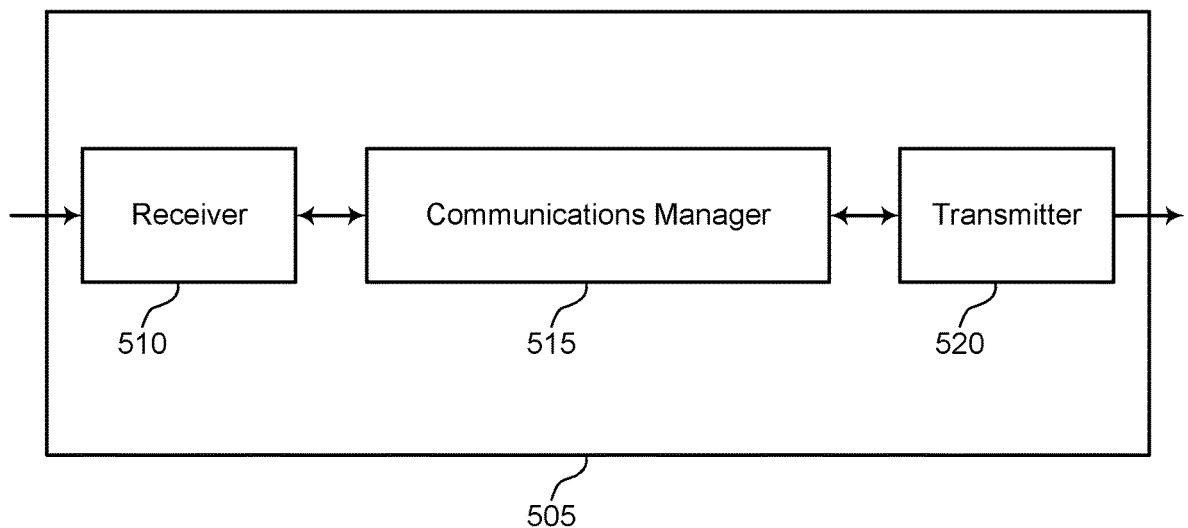
FIGS. 5 and 6 show block diagrams of devices that support data-aided beam management in accordance with aspects of the present disclosure.

FIG. 5 shows a block diagram of a device 505 that supports data-aided beam management in accordance with aspects of the present disclosure. The device 505 may be an example of aspects of a UE 115 as described herein. The device 505 may include a receiver 510, a communications manager 515, and a transmitter 520. The communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to data-aided beam management, among other examples). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, an indication of a capability of the UE to perform a first beam refinement procedure in response to a data transmission and using a set of receive beams, select a first receive beam from the set of receive beams based on performing a first instance of a second beam refinement procedure using the set of receive beams, receive the data transmission from the base station using the set of receive beams including the first receive beam before a second instance of the second beam refinement procedure, and perform the first beam refinement procedure based on receiving the data transmission.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, communications manager 515 may be implemented as an integrated circuit or chipset for a mobile device modem, and the receiver 510 and transmitter 520 may be implemented as analog components (for example, amplifiers, filters, and antennas) coupled with the mobile device modem to enable wireless transmission and reception.

The communications manager 515 as described herein may be implemented to realize one or more potential advantages. At least one implementation may enable communications manager 515 to effectively identify a data transmission and skip (refrain from performing) a subsequent beam refinement procedure. In some other implementations, the communications manager 515 may identify a capability to perform simultaneous beam measurements on multiple receive beams at the device 505.

Based on implementing the techniques as described herein, one or more processors of the device 505 (for example, processor(s) controlling or incorporated with one or more of receiver 510, communications manager 515, and transmitter 520) may effectively reduce signaling overhead associated with beam training and beam management. In some other examples, the techniques described herein may allow for reduced latency for performing beam management procedures, and may increase communications reliability and quality, while increasing throughput.

Figure 6:
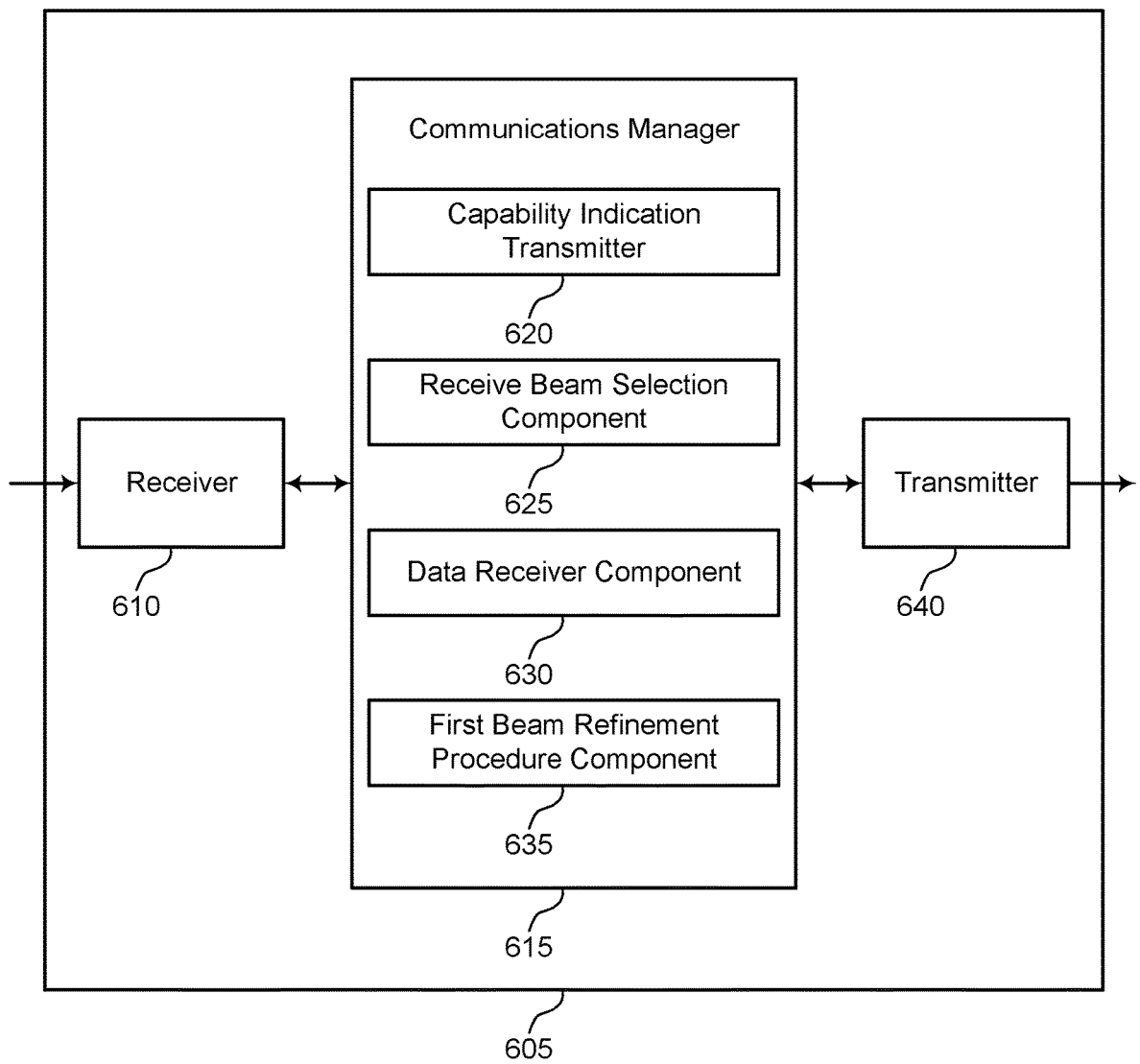

FIG. 6 shows a block diagram of a device 605 that supports data-aided beam management in accordance with aspects of the present disclosure. The device 605 may be an example of aspects of a device 505, or a UE 115 as described herein. The device 605 may include a receiver 610, a communications manager 615, and a transmitter 640. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to data-aided beam management, among other examples). Information may be passed on to other components of the device 605. The receiver 610 may be an example of aspects of the transceiver 820 described with reference to FIG. 8. The receiver 610 may utilize a single antenna or a set of antennas.

The communications manager 615 may include a capability indication transmitter 620, a receive beam selection component 625, a data receiver component 630, and a first beam refinement procedure component 635.

The capability indication transmitter 620 may transmit, to a base station, an indication of a capability of the UE to perform a first beam refinement procedure in response to a data transmission and using a set of receive beams.

The receive beam selection component 625 may select a first receive beam from the set of receive beams based on performing a first instance of a second beam refinement procedure using the set of receive beams.

The data receiver component 630 may receive the data transmission from the base station using the set of receive beams including the first receive beam before a second instance of the second beam refinement procedure.

The first beam refinement procedure component 635 may perform the first beam refinement procedure based on receiving the data transmission.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
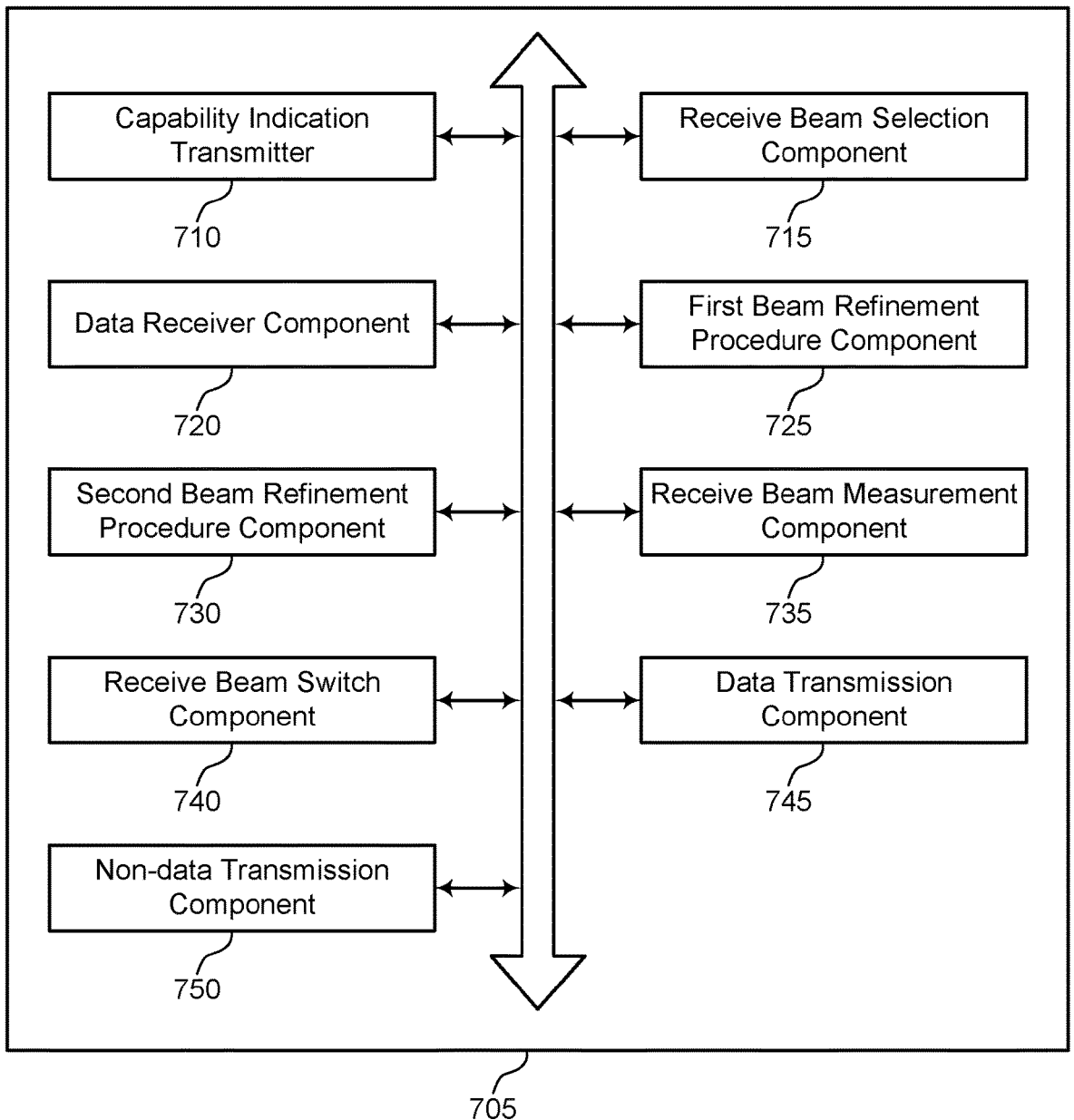
FIG. 7 shows a block diagram of a communications manager that supports data-aided beam management in accordance with aspects of the present disclosure.

FIG. 7 shows a block diagram of a communications manager 705 that supports data-aided beam management in accordance with aspects of the present disclosure. The communications manager 705 may be an example of aspects of a communications manager 515, a communications manager 615, or a communications manager 810 described herein. The communications manager 705 may include a capability indication transmitter 710, a receive beam selection component 715, a data receiver component 720, a first beam refinement procedure component 725, a second beam refinement procedure component 730, a receive beam measurement component 735, a receive beam switch component 740, a data transmission component 745, and a non-data transmission component 750. Each of these components may communicate, directly or indirectly, with one another (for example, via one or more buses).

The capability indication transmitter 710 may transmit, to a base station, an indication of a capability of the UE to perform a first beam refinement procedure in response to a data transmission and using a set of receive beams. In some examples, the capability indication transmitter 710 may transmit the capability to perform the first beam refinement procedure via a radio resource control message, a medium access control-control element, or both. In some examples, the capability indication transmitter 710 may transmit an indication of a capability of the UE to receive the data transmission simultaneously using the set of receive beams.

The receive beam selection component 715 may select a first receive beam from the set of receive beams based on performing a first instance of a second beam refinement procedure using the set of receive beams. In some examples, the receive beam selection component 715 may select a second receive beam of the set of receive beams based on measuring the one or more beam refinement parameters.

The first beam refinement procedure component 725 may perform the first beam refinement procedure based on receiving the data transmission. The data receiver component 720 may receive the data transmission from the base station using the set of receive beams including the first receive beam before a second instance of the second beam refinement procedure.

In some examples, the first beam refinement procedure component 725 may receive the data transmission on a physical downlink control channel, where measuring the one or more beam refinement parameters includes measuring the one or more beam refinement parameters on a downlink modulation reference signal of the physical downlink control channel.

In some examples, the data receiver component 720 may receive a second data transmission using a third receive beam. In some examples, the first beam refinement procedure component 725 may concurrently perform the first beam refinement procedure for the first and the third receive beams based on receiving the data transmission and the second data transmission.

The second beam refinement procedure component 730 may suspend performing the second instance of the second beam refinement procedure based on receiving the data transmission. In some examples, the second beam refinement procedure component 730 may transmit, to the base station, an indication of the duration for which to suspend the second beam refinement procedure. In some examples, the second beam refinement procedure component 730 may determine a duration for which to suspend the second beam refinement procedure based on a doppler spread measurement, a radio resource control message, or both.

In some examples, the second beam refinement procedure component 730 may perform the second beam refinement procedure based on the receiving of the one or more non-data transmissions and a duration after performing the first beam refinement procedure. The non-data transmission component 750 may receive one or more non-data transmissions from the base station after receiving the data transmission. In some examples, the second beam refinement procedure includes a P3 procedure.

The receive beam measurement component 735 may measure one or more beam refinement parameters for each beam of the set of receive beams. In some examples, the receive beam measurement component 735 may measure the one or more beam refinement parameters on a downlink modulation reference signal of the physical downlink control channel.

In some examples, the receive beam measurement component 735 may measure the one or more beam refinement parameters for each beam of the set of receive beams during an orthogonal frequency division multiplexing symbol period. In some examples, the receive beam measurement component 735 may compare a first value of the one or more beam refinement parameters associated with the first receive beam to a second value of the one or more beam refinement parameters associated with a second receive beam. In some examples, the one or more beam refinement parameters include a reference signal receive power, a signal to interference and noise ratio, a channel quality indication, a system capacity, or any combination thereof.

In some examples, the receive beam measurement component 735 may select the second receive beam or the first receive beam based on the comparing. The receive beam switch component 740 may switch, during the orthogonal frequency division multiplexing symbol period or during an adjacent orthogonal frequency division multiplexing symbol period, from the first receive beam to the second receive beam based on comparing the first value to the second value.

The data transmission component 745 may transmit, to the base station, one or more data transmissions during a duration associated with the second instance of the second beam refinement procedure based on the indication of the capability of the UE to perform the first beam refinement procedure.

Figure 8:
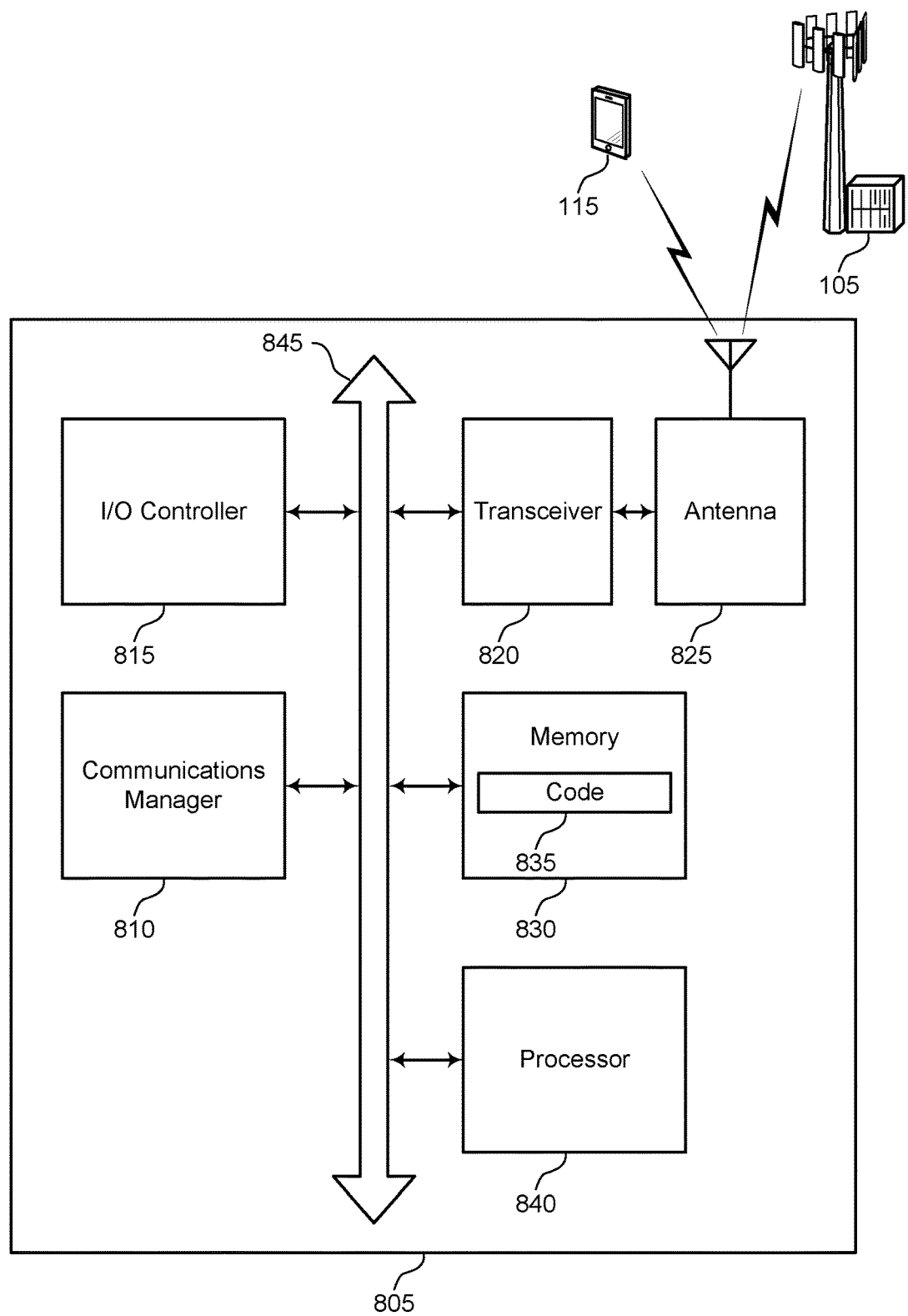
FIG. 8 shows a diagram of a system including a device that supports data-aided beam management in accordance with aspects of the present disclosure.

FIG. 8 shows a diagram of a system including a device 805 that supports data-aided beam management in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (for example, bus 845).

The communications manager 810 may transmit, to a base station, an indication of a capability of the UE to perform a first beam refinement procedure in response to a data transmission and using a set of receive beams, select a first receive beam from the set of receive beams based on performing a first instance of a second beam refinement procedure using the set of receive beams, receive the data transmission from the base station using the set of receive beams including the first receive beam before a second instance of the second beam refinement procedure, and perform the first beam refinement procedure based on receiving the data transmission.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some examples, the memory 830 may contain, among other things, a basic input/output system (BIOS) which may control basic hardware or software operation such as the interaction with peripheral components or devices.

The processor 840 may include an intelligent hardware device, (for example, a general-purpose processor, a DSP, a CPU, a microcontroller, an ASIC, a field programmable gate array (FPGA), a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting data-aided beam management).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
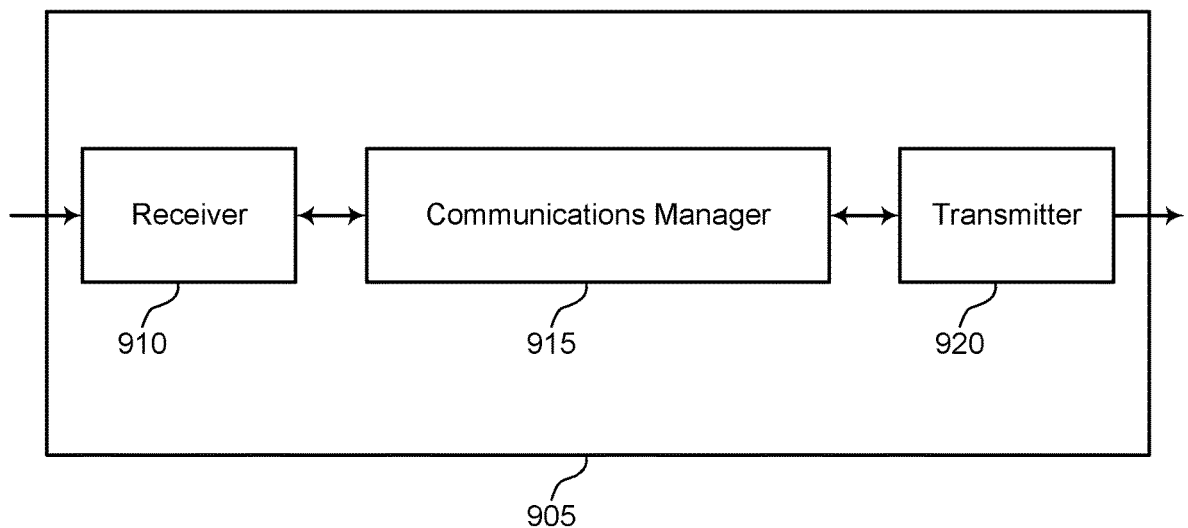
FIGS. 9 and 10 show block diagrams of devices that support data-aided beam management in accordance with aspects of the present disclosure.

FIG. 9 shows a block diagram of a device 905 that supports data-aided beam management in accordance with aspects of the present disclosure. The device 905 may be an example of aspects of a base station 105 as described herein. The device 905 may include a receiver 910, a communications manager 915, and a transmitter 920. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to data-aided beam management, among other examples). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, an indication of a capability of the UE to perform a first beam refinement procedure in response to a data transmission and using a set of receive beams, transmit a same transmit beam over consecutive symbols to the UE as part of a first instance of a second beam refinement procedure, and transmit the data transmission to the UE before a second instance of the second beam refinement procedure based on receiving the indication of the capability of the UE and transmitting the same transmit beam over consecutive symbols to the UE.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
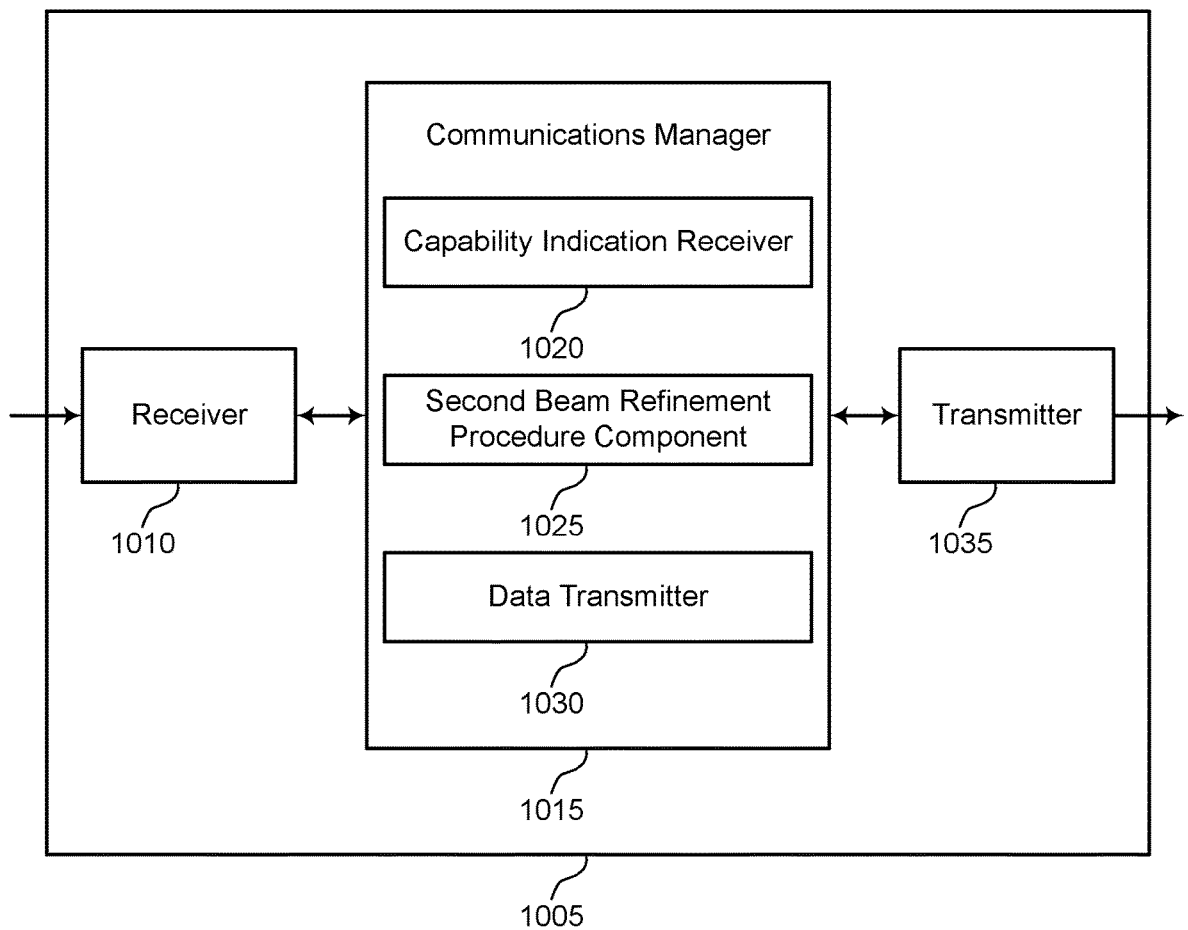

FIG. 10 shows a block diagram of a device 1005 that supports data-aided beam management in accordance with aspects of the present disclosure. The device 1005 may be an example of aspects of a device 905, or a base station 105 as described herein. The device 1005 may include a receiver 1010, a communications manager 1015, and a transmitter 1035. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to data-aided beam management, among other examples). Information may be passed on to other components of the device 1005. The receiver 1010 may be an example of aspects of the transceiver 1220 described with reference to FIG. 12. The receiver 1010 may utilize a single antenna or a set of antennas. The communications manager 1015 may include a capability indication receiver 1020, a second beam refinement procedure component 1025, and a data transmitter 1030.

The capability indication receiver 1020 may receive, from a UE, an indication of a capability of the UE to perform a first beam refinement procedure in response to a data transmission and using a set of receive beams.

The second beam refinement procedure component 1025 may transmit a same transmit beam over consecutive symbols to the UE as part of a first instance of a second beam refinement procedure.

The data transmitter 1030 may transmit the data transmission to the UE before a second instance of the second beam refinement procedure based on receiving the indication of the capability of the UE and transmitting the same transmit beam over consecutive symbols to the UE.

The transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 described with reference to FIG. 12. The transmitter 1035 may utilize a single antenna or a set of antennas.

In some examples, communications manager 1015 may be implemented as an integrated circuit or chipset for a mobile device modem, and the receiver 1010 and transmitter 1035 may be implemented as analog components (for example, amplifiers, filters, and antennas) coupled with the mobile device modem to enable wireless transmission and reception.

The communications manager 1015 as described herein may be implemented to realize one or more potential advantages. At least one implementation may enable communications manager 1015 to effectively identify a UE capability to skip (refrain from performing) a next beam refinement procedure based on receiving a data transmission. In some other implementations, the communications manager 1015 may identify a UE capability to perform simultaneous beam measurements on multiple receive beams, thus eliminating repeated transmissions for receiver beam training.

Based on implementing the techniques as described herein, one or more processors of the device 1005 (for example, processor(s) controlling or incorporated with one or more of receiver 1010, communications manager 1015, and transmitter 1035) may effectively reduce signaling overhead associated with beam training and beam management. In some other examples, the techniques described herein may allow for reduced latency for performing beam management procedures, and may increase communications reliability and quality, while increasing throughput.

Figure 11:
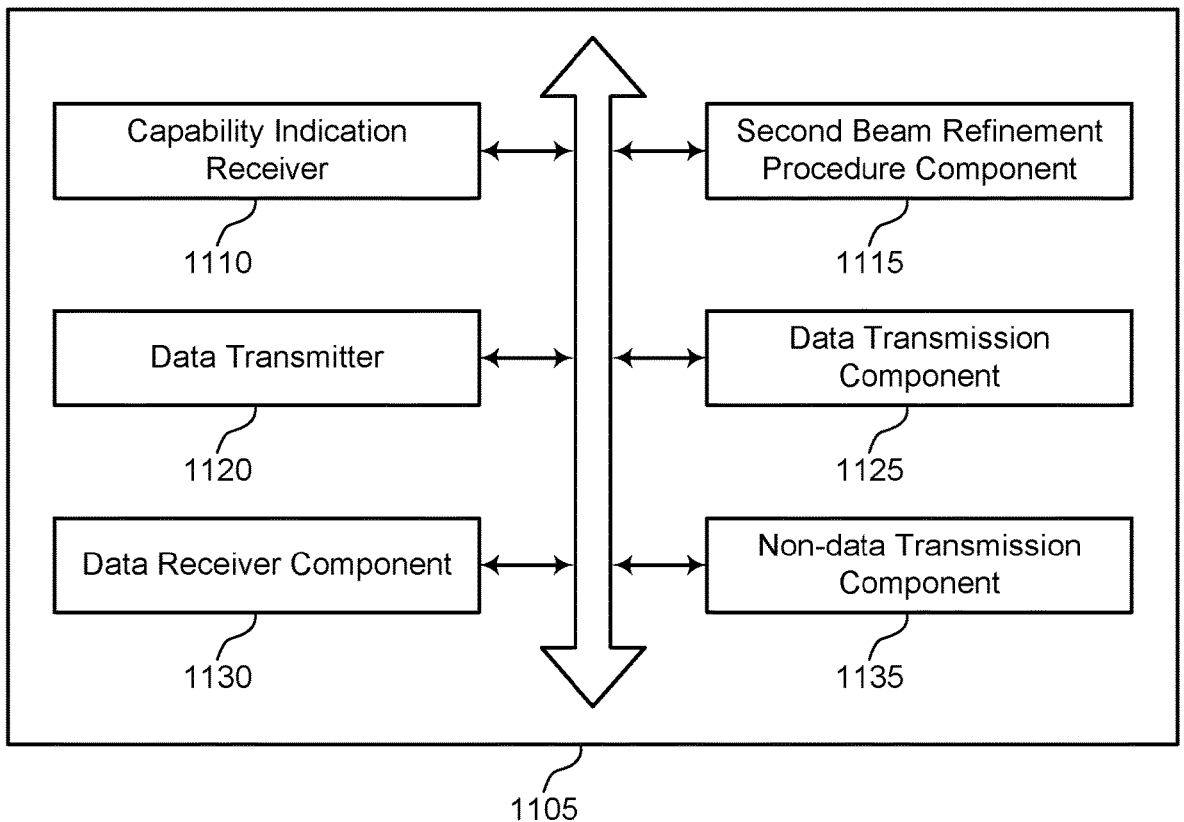
FIG. 11 shows a block diagram of a communications manager that supports data-aided beam management in accordance with aspects of the present disclosure.

FIG. 11 shows a block diagram of a communications manager 1105 that supports data-aided beam management in accordance with aspects of the present disclosure. The communications manager 1105 may be an example of aspects of a communications manager 915, a communications manager 1015, or a communications manager 1210 described herein. The communications manager 1105 may include a capability indication receiver 1110, a second beam refinement procedure component 1115, a data transmitter 1120, a data transmission component 1125, a data receiver component 1130, and a non-data transmission component 1135. Each of these components may communicate, directly or indirectly, with one another (for example, via one or more buses).

The capability indication receiver 1110 may receive, from a UE, an indication of a capability of the UE to perform a first beam refinement procedure in response to a data transmission and using a set of receive beams. In some examples, the capability indication receiver 1110 may receive an indication of a capability of the UE to receive the data transmission simultaneously using the set of receive beams, where transmitting the data transmission is based on receiving the indication of the capability of the UE to receive the data transmission simultaneously using the set of receive beams.

The data transmitter 1120 may transmit the data transmission to the UE before a second instance of the second beam refinement procedure based on receiving the indication of the capability of the UE and transmitting the same transmit beam over consecutive symbols to the UE.

The second beam refinement procedure component 1115 may transmit a same transmit beam over consecutive symbols to the UE as part of a first instance of a second beam refinement procedure. In some examples, the second beam refinement procedure component 1115 may suspend performing the second instance of the second beam refinement procedure based on transmitting the data transmission.

In some examples, the second beam refinement procedure component 1115 may receive, from the UE, an indication of a duration for which to suspend the second beam refinement procedure, the duration being based on a doppler spread measurement, a radio resource control message, or both. In some examples, the second beam refinement procedure includes a P3 procedure.

The data transmission component 1125 may transmit the data transmission on a physical downlink control channel, the method further including: communicating with the UE based on transmitting the data transmission on the physical downlink control channel. In some examples, the data transmission component 1125 may receive the indication of the capability of the UE to perform the first beam refinement procedure via a radio resource control message, a medium access control-control element, or both.

The data receiver component 1130 may receive one or more data transmissions during a duration associated with the second instance of the second beam refinement procedure based on receiving the capability of the UE to perform the first beam refinement procedure.

The non-data transmission component 1135 may transmit one or more non-data transmissions to the UE after transmitting the data transmission after the UE performs the first beam refinement procedure and before the second instance of the second beam refinement procedure.

Figure 12:
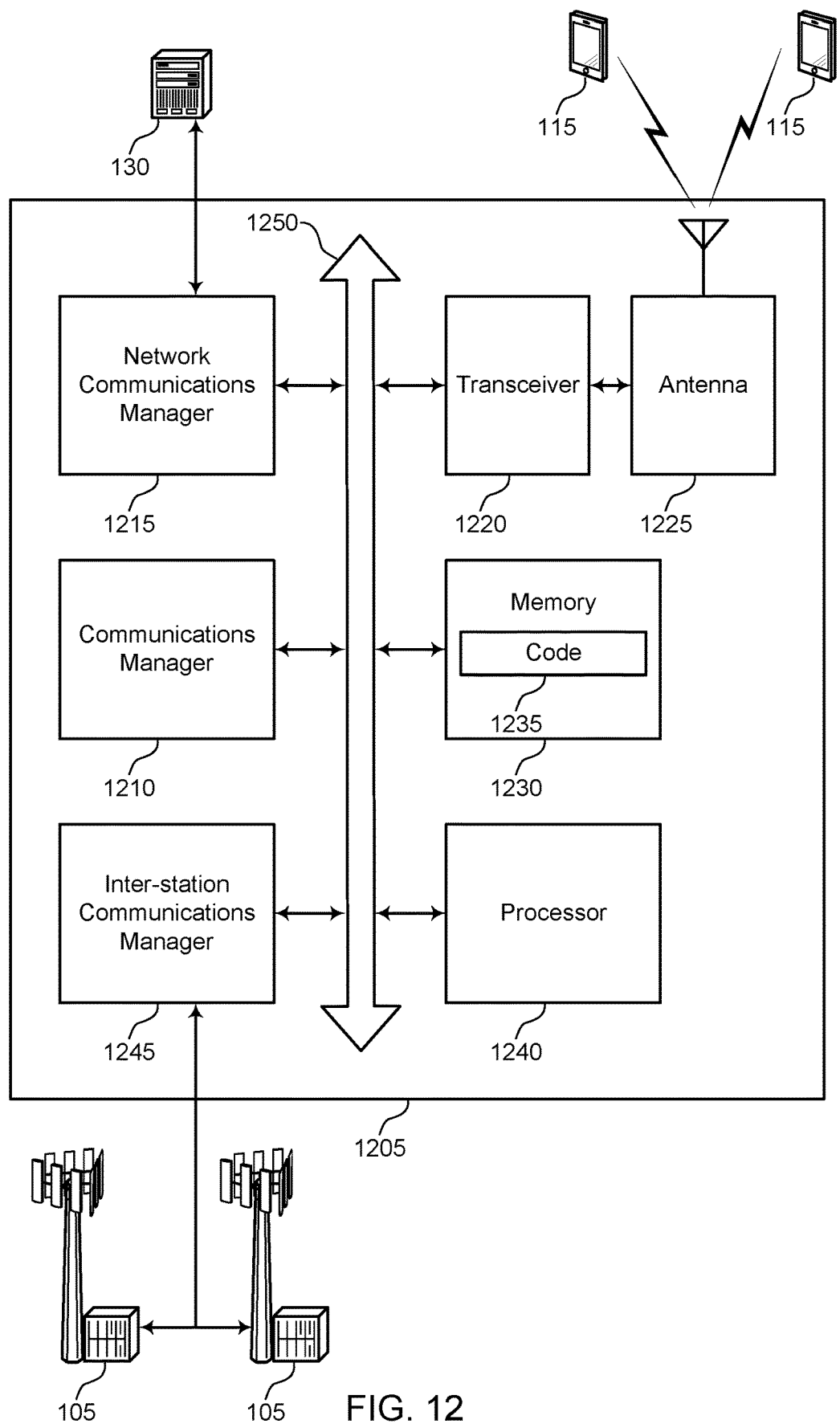
FIG. 12 shows a diagram of a system including a device that supports data-aided beam management in accordance with aspects of the present disclosure.

FIG. 12 shows a diagram of a system including a device 1205 that supports data-aided beam management in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (for example, bus 1250).

The communications manager 1210 may receive, from a UE, an indication of a capability of the UE to perform a first beam refinement procedure in response to a data transmission and using a set of receive beams, transmit a same transmit beam over consecutive symbols to the UE as part of a first instance of a second beam refinement procedure, and transmit the data transmission to the UE before a second instance of the second beam refinement procedure based on receiving the indication of the capability of the UE and transmitting the same transmit beam over consecutive symbols to the UE.

The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting data-aided beam management).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
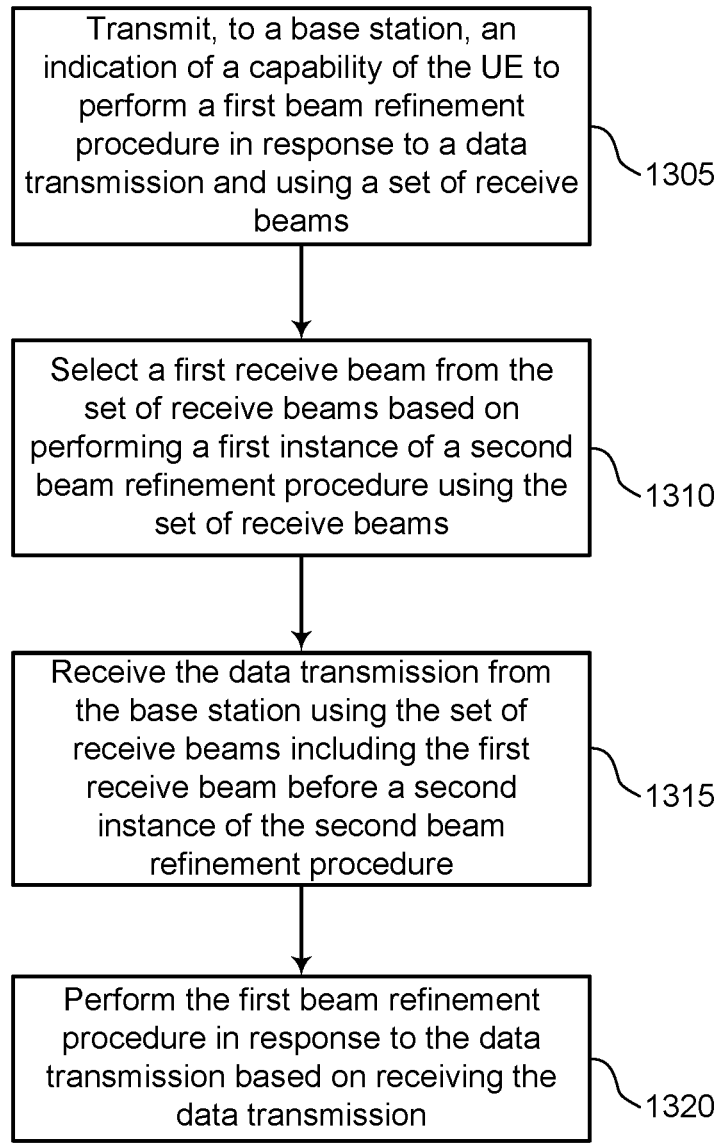
FIGS. 13 through 17 show flowcharts illustrating methods that support data-aided beam management in accordance with aspects of the present disclosure.

FIG. 13 shows a flowchart illustrating a method that supports data-aided beam management in accordance with aspects of the present disclosure. The operations of method 1300 may be implemented by a UE 115 or its components as described herein. For example, the operations of method 1300 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, an indication of a capability of the UE to perform a first beam refinement procedure in response to a data transmission and using a set of receive beams. The operations of 1305 may be performed according to the methods described herein. In some examples, aspects of the operations of 1305 may be performed by a capability indication transmitter as described with reference to FIGS. 5-8.

At 1310, the UE may select a first receive beam from the set of receive beams based on performing a first instance of a second beam refinement procedure using the set of receive beams. The operations of 1310 may be performed according to the methods described herein. In some examples, aspects of the operations of 1310 may be performed by a receive beam selection component as described with reference to FIGS. 5-8.

At 1315, the UE may receive the data transmission from the base station using the set of receive beams including the first receive beam before a second instance of the second beam refinement procedure. The operations of 1315 may be performed according to the methods described herein. In some examples, aspects of the operations of 1315 may be performed by a data receiver component as described with reference to FIGS. 5-8.

At 1320, the UE may perform the first beam refinement procedure in response to the data transmission based on receiving the data transmission. The operations of 1320 may be performed according to the methods described herein. In some examples, aspects of the operations of 1320 may be performed by a first beam refinement procedure component as described with reference to FIGS. 5-8.

Figure 14:
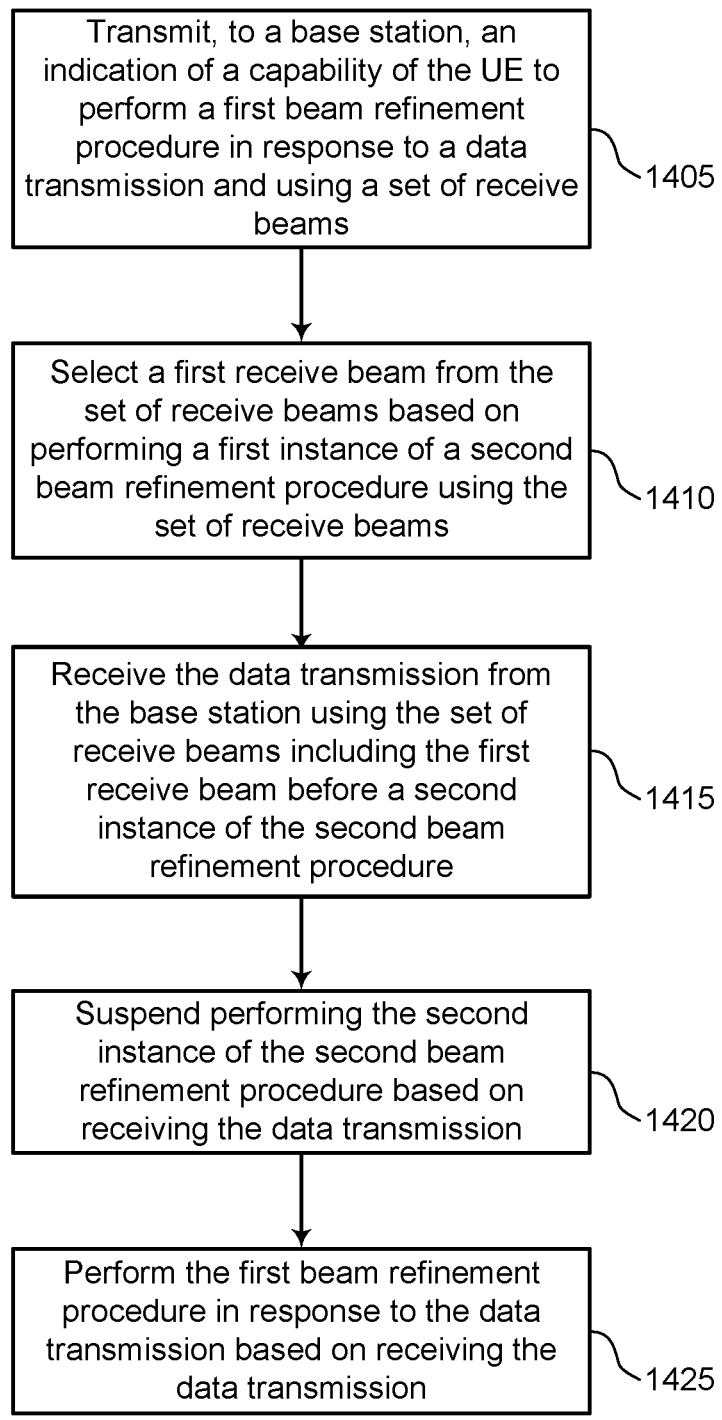

FIG. 14 shows a flowchart illustrating a method that supports data-aided beam management in accordance with aspects of the present disclosure. The operations of method 1400 may be implemented by a UE 115 or its components as described herein. For example, the operations of method 1400 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, an indication of a capability of the UE to perform a first beam refinement procedure in response to a data transmission and using a set of receive beams. The operations of 1405 may be performed according to the methods described herein. In some examples, aspects of the operations of 1405 may be performed by a capability indication transmitter as described with reference to FIGS. 5-8.

At 1410, the UE may select a first receive beam from the set of receive beams based on performing a first instance of a second beam refinement procedure using the set of receive beams. The operations of 1410 may be performed according to the methods described herein. In some examples, aspects of the operations of 1410 may be performed by a receive beam selection component as described with reference to FIGS. 5-8.

At 1415, the UE may receive the data transmission from the base station using the set of receive beams including the first receive beam before a second instance of the second beam refinement procedure. The operations of 1415 may be performed according to the methods described herein. In some examples, aspects of the operations of 1415 may be performed by a data receiver component as described with reference to FIGS. 5-8.

At 1420, the UE may suspend performing the second instance of the second beam refinement procedure based on receiving the data transmission. The operations of 1420 may be performed according to the methods described herein. In some examples, aspects of the operations of 1420 may be performed by a second beam refinement procedure component as described with reference to FIGS. 5-8.

At 1425, the UE may perform the first beam refinement procedure in response to the data transmission based on receiving the data transmission. The operations of 1425 may be performed according to the methods described herein. In some examples, aspects of the operations of 1425 may be performed by a first beam refinement procedure component as described with reference to FIGS. 5-8.

Figure 15:
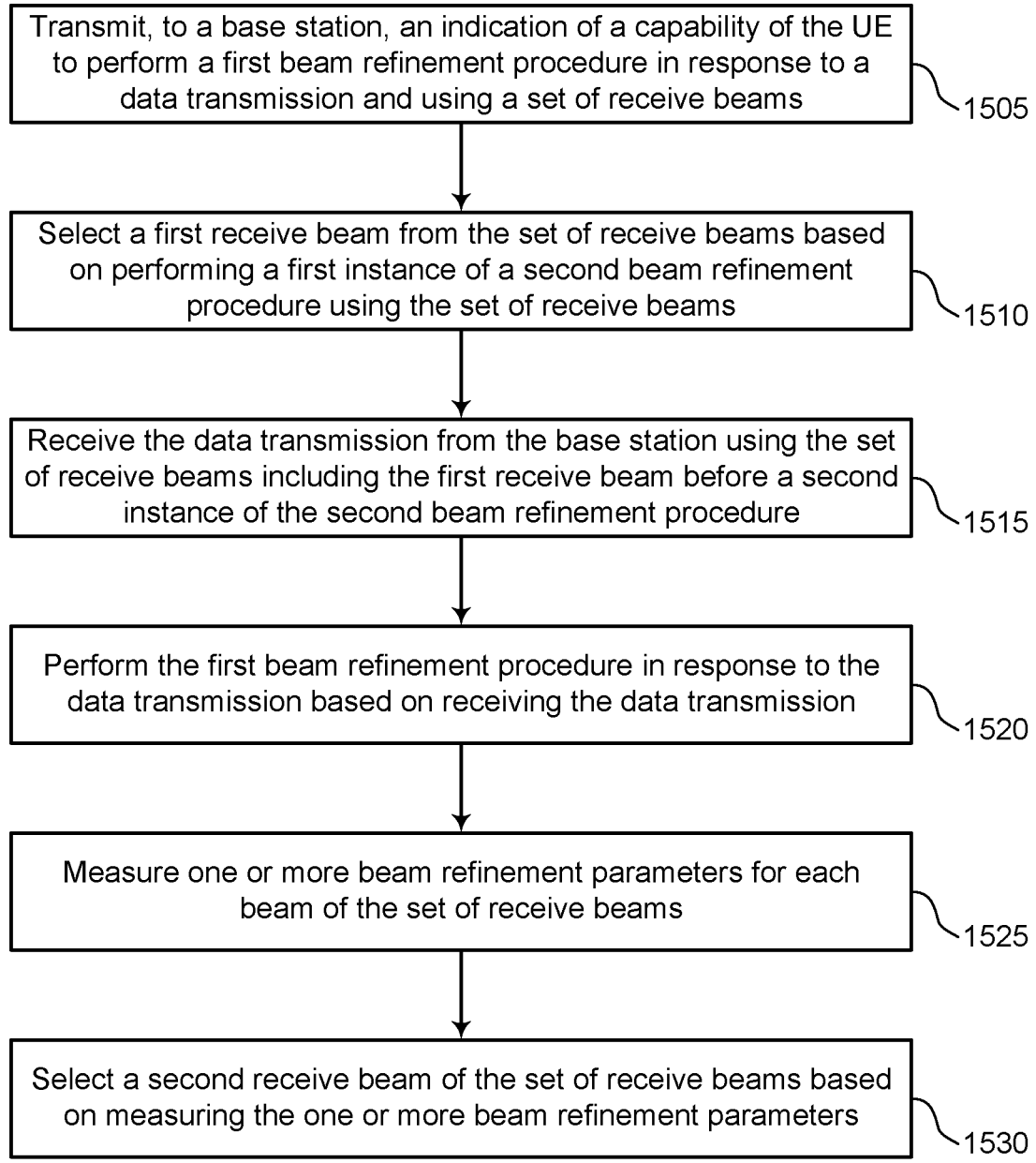

FIG. 15 shows a flowchart illustrating a method that supports data-aided beam management in accordance with aspects of the present disclosure. The operations of method 1500 may be implemented by a UE 115 or its components as described herein. For example, the operations of method 1500 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, an indication of a capability of the UE to perform a first beam refinement procedure in response to a data transmission and using a set of receive beams. The operations of 1505 may be performed according to the methods described herein. In some examples, aspects of the operations of 1505 may be performed by a capability indication transmitter as described with reference to FIGS. 5-8.

At 1510, the UE may select a first receive beam from the set of receive beams based on performing a first instance of a second beam refinement procedure using the set of receive beams. The operations of 1510 may be performed according to the methods described herein. In some examples, aspects of the operations of 1510 may be performed by a receive beam selection component as described with reference to FIGS. 5-8.

At 1515, the UE may receive the data transmission from the base station using the set of receive beams including the first receive beam before a second instance of the second beam refinement procedure. The operations of 1515 may be performed according to the methods described herein. In some examples, aspects of the operations of 1515 may be performed by a data receiver component as described with reference to FIGS. 5-8.

At 1520, the UE may perform the first beam refinement procedure based on receiving the data transmission. The operations of 1520 may be performed according to the methods described herein. In some examples, aspects of the operations of 1520 may be performed by a first beam refinement procedure component as described with reference to FIGS. 5-8.

At 1525, the UE may measure one or more beam refinement parameters for each beam of the set of receive beams. The operations of 1525 may be performed according to the methods described herein. In some examples, aspects of the operations of 1525 may be performed by a receive beam measurement component as described with reference to FIGS. 5-8.

At 1530, the UE may select a second receive beam of the set of receive beams based on measuring the one or more beam refinement parameters. The operations of 1530 may be performed according to the methods described herein. In some examples, aspects of the operations of 1530 may be performed by a receive beam selection component as described with reference to FIGS. 5-8.

Figure 16:
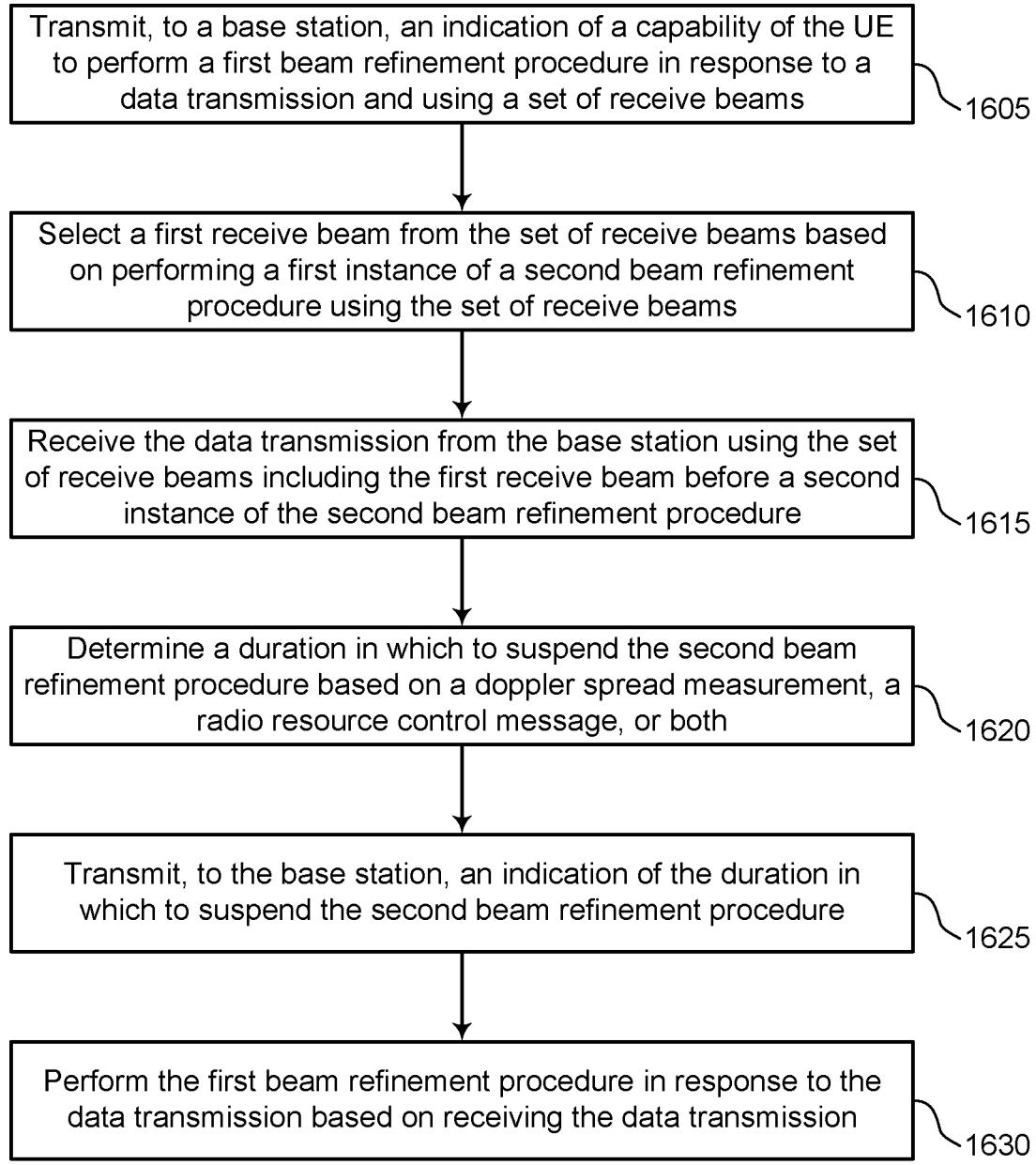

FIG. 16 shows a flowchart illustrating a method that supports data-aided beam management in accordance with aspects of the present disclosure. The operations of method 1600 may be implemented by a UE 115 or its components as described herein. For example, the operations of method 1600 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, an indication of a capability of the UE to perform a first beam refinement procedure in response to a data transmission and using a set of receive beams. The operations of 1605 may be performed according to the methods described herein. In some examples, aspects of the operations of 1605 may be performed by a capability indication transmitter as described with reference to FIGS. 5-8.

At 1610, the UE may select a first receive beam from the set of receive beams based on performing a first instance of a second beam refinement procedure using the set of receive beams. The operations of 1610 may be performed according to the methods described herein. In some examples, aspects of the operations of 1610 may be performed by a receive beam selection component as described with reference to FIGS. 5-8.

At 1615, the UE may receive the data transmission from the base station using the set of receive beams including the first receive beam before a second instance of the second beam refinement procedure. The operations of 1615 may be performed according to the methods described herein. In some examples, aspects of the operations of 1615 may be performed by a data receiver component as described with reference to FIGS. 5-8.

At 1620, the UE may determine a duration for which to suspend the second beam refinement procedure based on a doppler spread measurement, a radio resource control message, or both. The operations of 1620 may be performed according to the methods described herein. In some examples, aspects of the operations of 1620 may be performed by a second beam refinement procedure component as described with reference to FIGS. 5-8.

At 1625, the UE may transmit, to the base station, an indication of the duration for which to suspend the second beam refinement procedure. The operations of 1625 may be performed according to the methods described herein. In some examples, aspects of the operations of 1625 may be performed by a second beam refinement procedure component as described with reference to FIGS. 5-8.

At 1630, the UE may perform the first beam refinement procedure in response to the data transmission based on receiving the data transmission. The operations of 1630 may be performed according to the methods described herein. In some examples, aspects of the operations of 1630 may be performed by a first beam refinement procedure component as described with reference to FIGS. 5-8.

Figure 17:
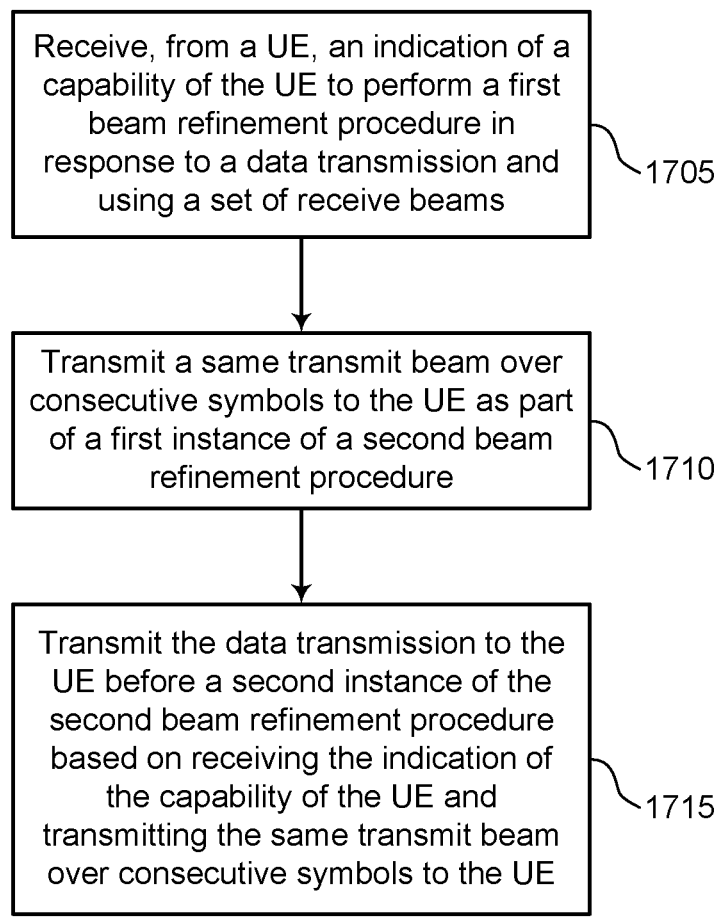

FIG. 17 shows a flowchart illustrating a method 1700 that supports data-aided beam management in accordance with aspects of the present disclosure. The operations of method 1700 may be implemented by a base station 105 or its components as described herein. For example, the operations of method 1700 may be performed by a communications manager as described with reference to FIGS. 9-12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, an indication of a capability of the UE to perform a first beam refinement procedure in response to a data transmission and using a set of receive beams. The operations of 1705 may be performed according to the methods described herein. In some examples, aspects of the operations of 1705 may be performed by a capability indication receiver as described with reference to FIGS. 9-12.

At 1710, the base station may transmit a same transmit beam over consecutive symbols to the UE as part of a first instance of a second beam refinement procedure. The operations of 1710 may be performed according to the methods described herein. In some examples, aspects of the operations of 1710 may be performed by a second beam refinement procedure component as described with reference to FIGS. 9-12.

At 1715, the base station may transmit the data transmission to the UE before a second instance of the second beam refinement procedure based on receiving the indication of the capability of the UE and transmitting the same transmit beam over consecutive symbols to the UE. The operations of 1715 may be performed according to the methods described herein. In some examples, aspects of the operations of 1715 may be performed by a data transmitter as described with reference to FIGS. 9-12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting, to a base station, an indication of a capability of the UE to perform a first beam refinement procedure in response to a data transmission and using a plurality of receive beams;
   selecting a first receive beam from the plurality of receive beams based at least in part on performing a first instance of a second beam refinement procedure using the plurality of receive beams;
   receiving the data transmission from the base station using the plurality of receive beams comprising the first receive beam before a second instance of the second beam refinement procedure; and
   performing the first beam refinement procedure based at least in part on receiving the data transmission.

2. The method of claim 1, further comprising suspending performing the second instance of the second beam refinement procedure based at least in part on receiving the data transmission.

3. The method of claim 2, further comprising:
   determining a duration for which to suspend the second beam refinement procedure based at least in part on a doppler spread measurement, a radio resource control message, or both; and
   transmitting, to the base station, an indication of the duration for which to suspend the second beam refinement procedure.

4. The method of claim 1, wherein performing the first beam refinement procedure comprises:
   measuring one or more beam refinement parameters for each beam of the plurality of receive beams; and
   selecting a second receive beam of the plurality of receive beams based at least in part on measuring the one or more beam refinement parameters.

5. The method of claim 1, wherein receiving the data transmission from the base station comprises:
   receiving the data transmission on a physical downlink control channel, and wherein measuring the one or more beam refinement parameters comprises; and
   measuring the one or more beam refinement parameters on a downlink modulation reference signal of the physical downlink control channel.

6. The method of claim 1, wherein performing the first beam refinement procedure comprises:
   measuring the one or more beam refinement parameters for each beam of the plurality of receive beams during an orthogonal frequency division multiplexing symbol period;
   comparing a first value of the one or more beam refinement parameters associated with the first receive beam to a second value of the one or more beam refinement parameters associated with a second receive beam; and
   selecting the second receive beam or the first receive beam based at least in part on the comparing.

7. The method of claim 6, further comprising switching, during the orthogonal frequency division multiplexing symbol period or during an adjacent orthogonal frequency division multiplexing symbol period, from the first receive beam to the second receive beam based at least in part on comparing the first value to the second value.

8. The method of claim 1, wherein the one or more beam refinement parameters comprise a reference signal receive power, a signal to interference and noise ratio, a channel quality indication, a system capacity, or any combination thereof.

9. The method of claim 1, wherein transmitting the indication of the capability of the UE to perform the first beam refinement procedure comprises transmitting the capability to perform the first beam refinement procedure via a radio resource control message, a medium access control-control element, or both.

10. The method of claim 1, further comprising:
    receiving a second data transmission using a third receive beam; and
    concurrently performing the first beam refinement procedure for the first and the third receive beams based at least in part on receiving the data transmission and the second data transmission.

11. The method of claim 1, further comprising transmitting, to the base station, one or more data transmissions during a duration associated with the second instance of the second beam refinement procedure based at least in part on the indication of the capability of the UE to perform the first beam refinement procedure.

12. The method of claim 1, further comprising:
    receiving one or more non-data transmissions from the base station after receiving the data transmission; and
    performing the second beam refinement procedure based at least in part on the receiving of the one or more non-data transmissions and a duration after performing the first beam refinement procedure.

13. The method of claim 1, wherein transmitting the indication of the capability of the UE to perform the first beam refinement procedure comprises transmitting an indication of a capability of the UE to receive the data transmission simultaneously using the plurality of receive beams.

14. The method of claim 1, wherein the second beam refinement procedure comprises a P3 procedure.

15. A method for wireless communications at a base station, comprising:
    receiving, from a user equipment (UE), an indication of a capability of the UE to perform a first beam refinement procedure in response to a data transmission and using a plurality of receive beams;
    transmitting a same transmit beam over consecutive symbols to the UE as part of a first instance of a second beam refinement procedure; and
    transmitting the data transmission to the UE before a second instance of the second beam refinement procedure based at least in part on receiving the indication of the capability of the UE and transmitting the same transmit beam over consecutive symbols to the UE.

16. The method of claim 15, further comprising suspending performing the second instance of the second beam refinement procedure based at least in part on transmitting the data transmission.

17. The method of claim 16, further comprising receiving, from the UE, an indication of a duration for which to suspend the second beam refinement procedure, the duration being based at least in part on a doppler spread measurement, a radio resource control message, or both.

18. The method of claim 15, wherein transmitting the data transmission to the UE comprises:
    transmitting the data transmission on a physical downlink control channel, the method further comprising:
    communicating with the UE based at least in part on transmitting the data transmission on the physical downlink control channel.

19. The method of claim 15, wherein receiving the indication of the capability of the UE comprises receiving the indication of the capability of the UE to perform the first beam refinement procedure via a radio resource control message, a medium access control-control element, or both.

20. The method of claim 15, further comprising receiving one or more data transmissions during a duration associated with the second instance of the second beam refinement procedure based at least in part on receiving the capability of the UE to perform the first beam refinement procedure.

21. The method of claim 15, further comprising transmitting one or more non-data transmissions to the UE after transmitting the data transmission after the UE performs the first beam refinement procedure and before the second instance of the second beam refinement procedure.

22. The method of claim 15, wherein receiving the indication of the capability of the UE to perform the first beam refinement procedure comprises receiving an indication of a capability of the UE to receive the data transmission simultaneously using the plurality of receive beams, wherein transmitting the data transmission is based at least in part on receiving the indication of the capability of the UE to receive the data transmission simultaneously using the plurality of receive beams.

23. The method of claim 15, wherein the second beam refinement procedure comprises a P3 procedure.

24. An apparatus for wireless communications at a user equipment (UE), comprising:
a processor,
memory coupled with the processor; and
instructions stored in the memory and executable by the processor to cause the apparatus to:
transmit, to a base station, an indication of a capability of the UE to perform a first beam refinement procedure in response to a data transmission and using a plurality of receive beams;
select a first receive beam from the plurality of receive beams based at least in part on performing a first instance of a second beam refinement procedure using the plurality of receive beams;
receive the data transmission from the base station using the plurality of receive beams comprising the first receive beam before a second instance of the second beam refinement procedure; and
perform the first beam refinement procedure based at least in part on receiving the data transmission.

25. The apparatus of claim 24, wherein the instructions are further executable by the processor to cause the apparatus to suspend performing the second instance of the second beam refinement procedure based at least in part on receiving the data transmission.

26. The apparatus of claim 24, wherein the instructions to perform the first beam refinement procedure are executable by the processor to cause the apparatus to:
measure one or more beam refinement parameters for each beam of the plurality of receive beams; and
select a second receive beam of the plurality of receive beams based at least in part on measuring the one or more beam refinement parameters.

27. The apparatus of claim 24, wherein the instructions to receive the data transmission from the base station are executable by the processor to cause the apparatus to:
receive the data transmission on a physical downlink control channel, and wherein measuring the one or more beam refinement parameters comprises; and
measure the one or more beam refinement parameters on a downlink modulation reference signal of the physical downlink control channel.

28. The apparatus of claim 24, wherein the instructions to perform the first beam refinement procedure are executable by the processor to cause the apparatus to:
measure the one or more beam refinement parameters for each beam of the plurality of receive beams during an orthogonal frequency division multiplexing symbol period;
compare a first value of the one or more beam refinement parameters associated with the first receive beam to a second value of the one or more beam refinement parameters associated with a second receive beam; and
select the second receive beam or the first receive beam based at least in part on the comparing.

29. The apparatus of claim 24, wherein the instructions to transmit the indication of the capability of the UE to perform the first beam refinement procedure are executable by the processor to cause the apparatus to transmit the capability to perform the first beam refinement procedure via a radio resource control message, a medium access control-control element, or both.

30. An apparatus for wireless communications at a base station, comprising:
a processor,
memory coupled with the processor; and
instructions stored in the memory and executable by the processor to cause the apparatus to:
receive, from a user equipment (UE), an indication of a capability of the UE to perform a first beam refinement procedure in response to a data transmission and using a plurality of receive beams;
transmit a same transmit beam over consecutive symbols to the UE as part of a first instance of a second beam refinement procedure; and
transmit the data transmission to the UE before a second instance of the second beam refinement procedure based at least in part on receiving the indication of the capability of the UE and transmitting the same transmit beam over consecutive symbols to the UE.

* * * * *